United States Patent
Naito et al.

(10) Patent No.: US 12,351,062 B2
(45) Date of Patent: Jul. 8, 2025

(54) MANAGEMENT METHOD AND MANAGEMENT DEVICE FOR SHARED ELECTRIC VEHICLE, AND COMPUTER-READABLE RECORDING MEDIUM

(71) Applicant: Panasonic Intellectual Property Corporation of America, Torrance, CA (US)

(72) Inventors: Eiichi Naito, Kyoto (JP); Kohsuke Yoshioka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 213 days.

(21) Appl. No.: 17/889,039

(22) Filed: Aug. 16, 2022

(65) Prior Publication Data

US 2022/0388422 A1    Dec. 8, 2022

Related U.S. Application Data

(63) Continuation of application No. PCT/JP2021/016987, filed on Apr. 28, 2021.

(30) Foreign Application Priority Data

Jun. 10, 2020   (JP) .................................. 2020-100754

(51) Int. Cl.
*B60L 53/80* (2019.01)
*B60L 58/12* (2019.01)
*G06Q 30/0207* (2023.01)

(52) U.S. Cl.
CPC ............... *B60L 53/80* (2019.02); *B60L 58/12* (2019.02); *G06Q 30/0207* (2013.01)

(58) Field of Classification Search
CPC ...... B60L 53/80; B60L 58/12; G06Q 30/0207
See application file for complete search history.

(56) References Cited

U.S. PATENT DOCUMENTS

2021/0248535 A1* 8/2021 Ikui ..................... H01M 50/258

FOREIGN PATENT DOCUMENTS

| JP | 2013078168 A | * | 4/2013 | |
| JP | 5853549 | | 2/2016 | |
| WO | WO-2016169515 A1 | * | 10/2016 | .............. B60L 50/50 |

OTHER PUBLICATIONS

International Search Report (ISR) from International Searching Authority (Japan Patent Office) in International Pat. Appl. No. PCT/JP2021/016987, dated Jul. 20, 2021, together with an English language translation.

* cited by examiner

*Primary Examiner* — Vivek D Koppikar
*Assistant Examiner* — Jeffrey R Chalhoub
(74) *Attorney, Agent, or Firm* — Greenblum & Bernstein, P.L.C.

(57) ABSTRACT

When a management device receives battery exchange demand information from a first vehicle, the management device specifies at least one exchange partner candidate which is a vehicle providing a battery exchange with the first vehicle, transmits battery exchange request information to the exchange partner candidate, specifies, when receiving a battery exchange acceptance signal from a second vehicle, a battery exchange place based on location information about each of the first vehicle and the second vehicle, creates exchange instruction information including position information about the battery exchange place, and transmits the exchange instruction information to the first vehicle and the second vehicle.

18 Claims, 27 Drawing Sheets

(A)

78

| SCOOTER ID | BATTERY ID | USER ID FOR RENTAL | CURRENT LOCATION |
|---|---|---|---|
| v1 | b1 | u1 | cx11, cy11 |
| v2 | b2 | u2 | cx21, cy21 |
| ... | ... | ... | ... |

(B)

78

| SCOOTER ID | BATTERY ID | USER ID FOR RENTAL | CURRENT LOCATION |
|---|---|---|---|
| v1 | b2 | u1 | cx12, cy12 |
| v2 | b1 | u2 | cx22, cy22 |
| ... | ... | ... | ... |

(A)

| SCOOTER ID | BATTERY CELL UNIT ID | USER ID FOR RENTAL | CURRENT LOCATION |
|---|---|---|---|
| v1 | b1a, b1b | u1 | cx11, cy11 |
| v2 | b2a, b2b | u2 | cx21, cy21 |
| ... | ... | ... | ... |

(B)

| SCOOTER ID | BATTERY CELL UNIT ID | USER ID FOR RENTAL | CURRENT LOCATION |
|---|---|---|---|
| v1 | b1a, b2b | u1 | cx12, cy12 |
| v2 | b2a, b1b | u2 | cx22, cy22 |
| ... | ... | ... | ... |

(A)

78

| SCOOTER ID | BATTERY ID | USER ID FOR RENTAL | CURRENT LOCATION |
|---|---|---|---|
| v1 | b1 | u1 | cx11, cy11 |
| v2 | b2 | u2 | cx21, cy21 |
| ... | ... | ... | ... |

(B)

78

| SCOOTER ID | BATTERY ID | USER ID FOR RENTAL | CURRENT LOCATION |
|---|---|---|---|
| v1 | b2 | u2 | cx12, cy12 |
| v2 | b1 | u1 | cx22, cy22 |
| ... | ... | ... | ... |

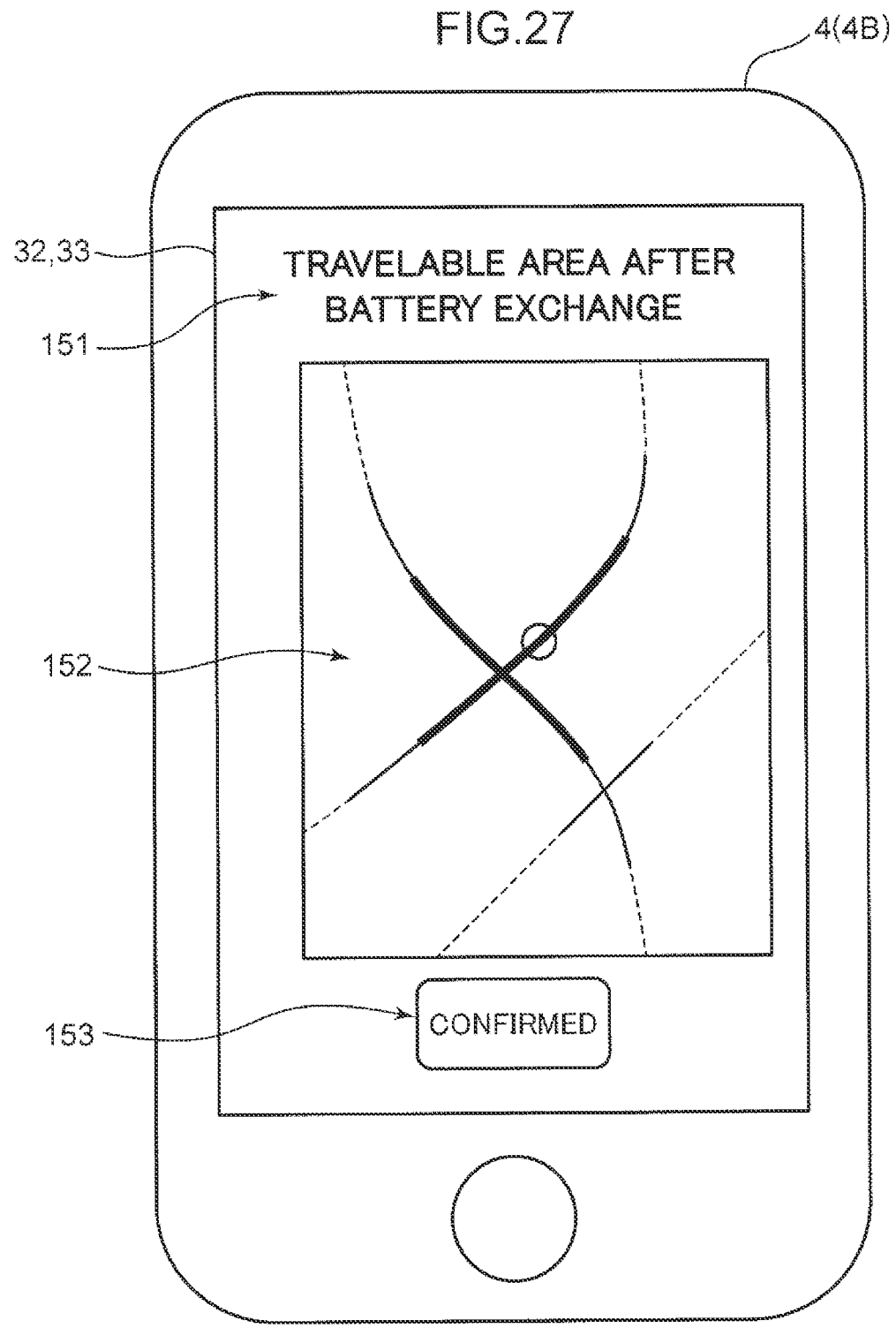

MANAGEMENT METHOD AND MANAGEMENT DEVICE FOR SHARED ELECTRIC VEHICLE, AND COMPUTER-READABLE RECORDING MEDIUM

TECHNICAL FIELD

This disclosure relates to a management method and a management device for a shamble electrically driven vehicle, and a computer-readable recording medium recording a program.

BACKGROUND ART

Patent Literature 1 discloses a system for transferring an electric power between a plurality of electric vehicles. In the system, when a specific vehicle (power receiving vehicle) has a battery remaining amount falling below a predetermined value, the power receiving vehicle sends a support requesting signal to another vehicle (power supply vehicle) located near the power receiving vehicle. The power supply vehicle supplies the electric power from a battery thereof to the battery of the power receiving vehicle at a power-receiving, desired spot designated by the power receiving vehicle.

Recently, electric scooter sharing services have been widely spreading, and thus a countermeasure against an electricity shortage of each vehicle has been demanded in the services.

The system for transferring an electric power disclosed in Patent Literature 1 needs to supply the electric power from the battery of the power supply vehicle to the battery of the power receiving vehicle by connecting the power supply vehicle and the power receiving vehicle to each other with a charging cable. Accordingly, the system requires a long time to complete the power supply work. In this respect, another countermeasure has been desired to be achieved.

CITATION LIST

Patent Literature

Patent Literature 1: Japanese Patent Publication No. 5853549

SUMMARY OF INVENTION

This disclosure provides a technology for easily and effectively preventing an electricity shortage of a shamble electrically driven vehicle.

To solve the aforementioned drawbacks, a method for managing a shamble electrically driven vehicle according to an aspect of this disclosure is a management method for managing a plurality of sharable electrically driven vehicles each configured to travel by an electric power supplied from a battery. The management method, by a management device, includes: when receiving battery exchange demand information from a first vehicle included in the shamble electrically driven vehicles, specifying at least one exchange partner candidate which is a vehicle providing a battery exchange with the first vehicle; transmitting battery exchange request information to the exchange partner candidate; specifying, when receiving a battery exchange acceptance signal from a second vehicle of the exchange partner candidate, a battery exchange place based on location information about each of the first vehicle and the second vehicle; creating exchange instruction information including position information about the battery exchange place; and transmitting the exchange instruction information to the first vehicle and the second vehicle.

BRIEF DESCRIPTION OF DRAWINGS

FIG. 27 shows an example of a display state of a travelable area display screen image onto the display part.

DESCRIPTION OF EMBODIMENTS

Figure 1:
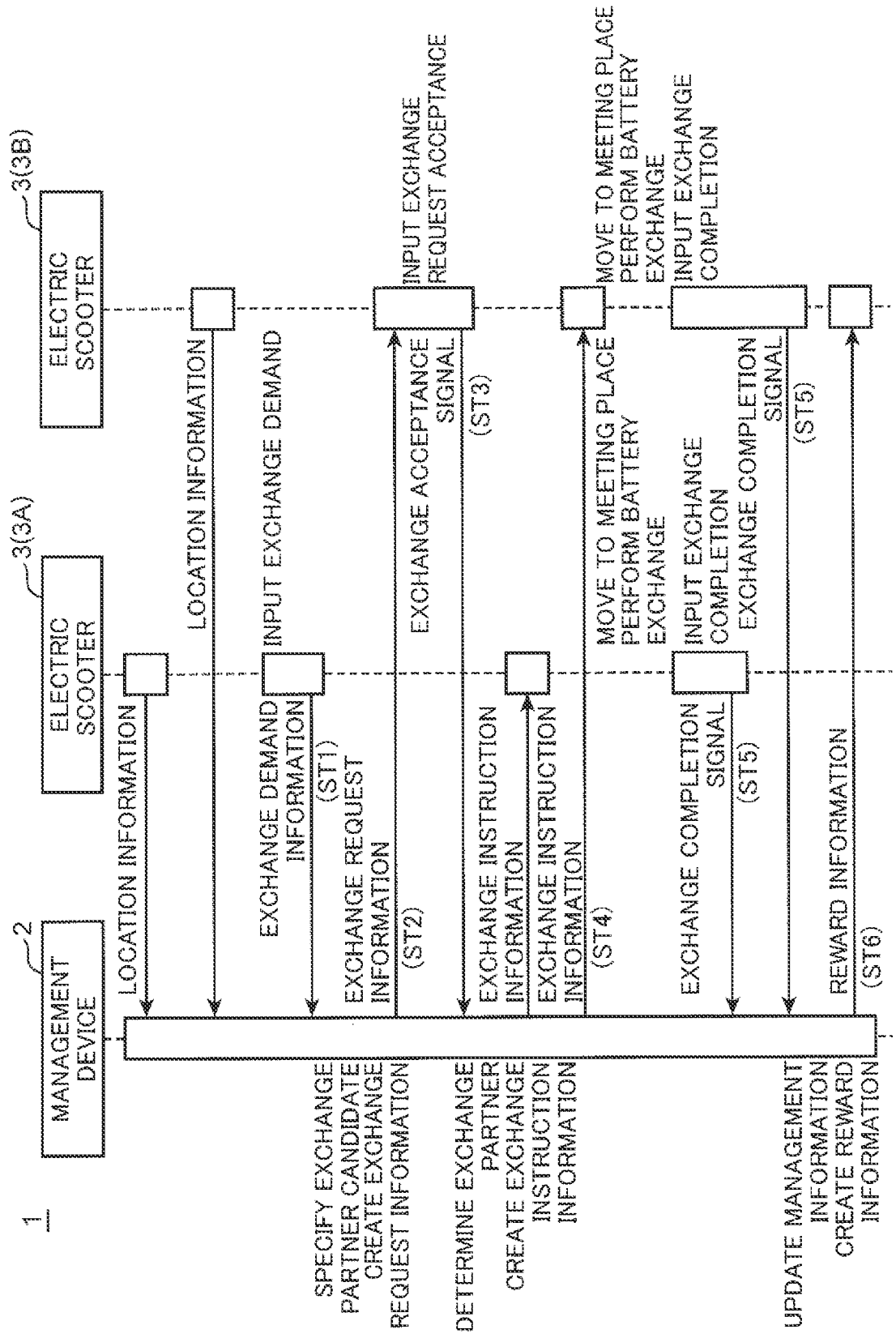
FIG. 1 shows an overview of a process sequence executed by a management device and an electric scooter.

Knowledge Forming the Basis of the Present Disclosure

Recently, electric scooter sharing services have been widely spreading. A user rents an electric scooter among a plurality of electric scooters parked at a service base, such as a service offering place or a parking lot, and returns the electric scooter to the same service base or a difference service base within a predetermined time period based on a rental fee after freely using the electric scooter. The electric scooter has a battery which is periodically charged by a manager at each service base. The user having rented the electric scooter with the fully charged battery can travel at a maximum traveling distance corresponding to a battery capacity of the battery.

However, the maximum traveling distance of the electric scooter is defined in accordance with the battery capacity. Hence, an attempt to travel at a distance equal to or longer than the maximum traveling distance will cause an electricity shortage when a battery remaining amount reaches zero. In a case where the battery is not fully charged at the time of the rental by the user, the electricity shortage will occur even in travelling at a distance shorter than the maximum traveling distance. Such occurrence of the electricity shortage would render the electric scooter inoperative to travel, and thus a countermeasure against the electricity shortage is extremely important in the electric scooter sharing services.

Hereinafter, Patent Literature 1 will be discussed. Patent Literature 1 discloses a system for transferring an electric power between a plurality of electric vehicles. In the system, when a specific vehicle (power receiving vehicle) has a battery remaining amount falling below a predetermined value, the power receiving vehicle sends a support requesting signal to another vehicle (power supply vehicle) located near the power receiving vehicle. The power supply vehicle supplies the electric power from a battery thereof to the battery of the power receiving vehicle at a power-receiving desired spot designated by the power receiving vehicle. However, the system for transferring an electric power as disclosed in Patent Literature 1 needs to supply the electric power from the battery of the power supply vehicle to the battery of the power receiving vehicle by connecting the power supply vehicle and the power receiving vehicle to each other with a charging cable. Accordingly, the system requires a long time to complete the power supply work. In this respect, the system for transferring the electric power as disclosed in Patent Literature 1 is unadaptable, to the countermeasure against the electricity shortage in the electric scooter sharing services.

To overcome the drawbacks, the present inventors have focused on the following features peculiar to the electric scooter sharing services. Specifically, an owner of a battery of an electric scooter is not a user but a manager, an administrator, or a service owner, and the battery is, in this respect, sharable. Besides, the battery of the electric scooter has a small size and a light weight, and therefore is easily mountable to and dismountable from the scooter by the user. Conclusively, the present inventors have obtained the knowledge that the electricity shortage of the electric scooter is easily and effectively preventable by performing a battery exchange between one electric scooter having an insufficient battery remaining amount and another electric scooter having a sufficient battery remaining amount, and have conceived of this disclosure.

Next, various aspects of the disclosure will be described.

A method for managing a sharable electrically driven vehicle according to an aspect of this disclosure is a management method for managing a plurality of sharable electrically driven vehicles each configured to travel by an electric power supplied from a battery. The management method, by a management device, includes: when receiving battery exchange demand information from a first vehicle included in the sharable electrically driven vehicles, specifying at least one exchange partner candidate which is a vehicle providing a battery exchange with the first vehicle; transmitting battery exchange request information to the exchange partner candidate; specifying, when receiving a battery exchange acceptance signal from a second vehicle of the exchange partner candidate, a battery exchange place based on location information about each of the first vehicle and the second vehicle; creating exchange instruction information including position information about the battery exchange place; and transmitting the exchange instruction information to the first vehicle and the second vehicle.

This configuration can effectively prevent the first vehicle from suffering an electricity shortage by the battery exchange between the first vehicle having sent the exchange demand information and the second vehicle having sent the exchange acceptance signal. The exchange results in permitting the first vehicle to travel at a long distance exceeding a maximum traveling distance restricted on a battery capacity. Furthermore, the battery exchange between the first vehicle and the second vehicle enables the respective users thereof to complete the exchange work more easily at a shorter time than a supply of an electric power from the second vehicle to the first vehicle connected to each other with a charging cable. Moreover, the cooperation between the users prevents each vehicle from suffering the electricity shortage, and hence, a manager of a sharing service for the electrically driven vehicles can reduce the number of places for arranging support vehicles and the number of the support vehicles. Consequently, the running cost of the service is reduceable.

In the aspect, the management device may give a predetermined reward to a user of the second vehicle when receiving a battery exchange completion signal from the second vehicle.

This configuration includes giving a reward to the user of the second vehicle, and thus can offer an incentive to each user to accept a battery exchange request when receiving relevant battery exchange request information.

In the aspect, the management device may determine an amount of the reward in accordance with a battery remaining amount of the provided battery from the second vehicle.

This configuration can increase the incentive to accept the battery exchange request by differentiating the amount of the reward in accordance with the battery remaining amount of the provided battery.

In the aspect, the management device may transmit, to the first vehicle, support information including information indicating a support to be performed by a manager, when receiving no exchange acceptance signal from the exchange partner candidate.

This configuration can prevent the first vehicle from suffering the electricity shortage by causing the manager to perform the support when receiving no exchange acceptance signal from the exchange partner candidate.

In the aspect, the battery exchange demand information may include information indicating a battery remaining amount demanded by the first vehicle.

In this configuration, the exchange demand information includes information indicating the battery remaining amount demanded by the first vehicle. The management device transmits the exchange request information including the remaining amount relevant information to the exchange partner candidate. Accordingly, the user of the vehicle having received exchange request information can determine whether the battery remaining amount of the vehicle of the user is equal to or larger than the battery remaining amount demanded by the first vehicle. When the management device manages the battery remaining amount of each vehicle, the management device can exclude, from exchange partner candidates, a vehicle having the current battery remaining amount which is smaller than the battery remaining amount demanded by the first vehicle.

In the aspect, the management device may receive information indicating a current battery remaining amount from each of the vehicles, and exclude, from exchange partner candidates, a vehicle having the current battery remaining amount which is smaller than the battery remaining amount demanded by the first vehicle.

According to this configuration, the management device excludes, from the exchange partner candidates, a vehicle having the current battery remaining amount which is smaller than the battery remaining amount demanded by the first vehicle. This configuration can avoid, in advance, wastefully sending the exchange request information to such a vehicle that cannot accept the battery exchange request.

In the aspect, the battery exchange request information may include information indicating a battery remaining amount of the first vehicle.

In this configuration, the exchange request information includes information indicating the battery remaining amount of the first vehicle. The management device transmits the exchange request information including, the remaining amount relevant information to the exchange partner candidate. Accordingly, the user of the vehicle having received the exchange request information can determine whether the vehicle of the user can reach a destination with the battery obtained after the battery exchange with the first vehicle.

In the aspect, the second vehicle may be allowed to display, based on the information indicating the battery remaining amount of the first vehicle, map information showing a travelable area of the second vehicle after the battery exchange.

In this configuration, the user of the vehicle having received the exchange request information can easily determine, by using the map information, whether the vehicle of the user can reach the destination with the exchanged battery.

In the aspect, the management device may receive current location information from each of the vehicles, and specify, as the exchange partner candidate, at least one vehicle whose distance to the first vehicle indicates a predetermined value or smaller at a time of receiving the battery exchange demand information from the first vehicle.

According to this configuration, the management device can easily specify an exchange partner candidate.

In the aspect, the management device may receive current location information and destination information from each of the vehicles, and specify, as the exchange partner candidate, at least one vehicle whose distance to the first vehicle reaches a predetermined value or smaller in a lapse of a predetermined time after a time of receiving the exchange demand information from the first vehicle.

According to this configuration, the management device can specify an exchange partner candidate which is highly likely to accept a battery exchange request.

In the aspect, the battery may include at least one battery cell unit. The battery exchange may be performed per battery including the battery cell unit.

This configuration eliminates the need for managing the battery remaining amount per battery cell unit in each vehicle and the management device, and thus can simplify the process more effectively than a configuration based on an exchange per battery cell unit.

In the aspect, the management device may hold management information setting a correspondence relation between identification information of each of the vehicles and identification information of the battery mounted on each of the vehicles, and may update, when the battery exchange is performed between the first vehicle and the second vehicle, a set content of the correspondence relation between the identification information of the vehicle and the identification of the battery among the management information for each of the first vehicle and the second vehicle.

According to this configuration, the management device updates the management information. Consequently, the management device can hold correct management information even after the battery exchange between the first vehicle and the second vehicle.

In the aspect, the battery may include a plurality of battery cell units which are independently exchangeable. The exchange instruction information may include identification information of a battery cell unit to be exchanged. The battery exchange may be performed per battery cell unit.

This configuration based on the exchange per battery cell unit succeeds in adjusting an amount of increase or decrease in the battery remaining amount accompanied by the exchange more finely than a configuration based on the exchange per battery.

In the aspect, the management device may hold management information setting a correspondence relation between identification information of each of the vehicles and identification of each of the battery cell units mounted on each of the vehicles, and update, when a battery cell unit exchange is performed between the first vehicle and the second vehicle, a set content of the correspondence relation between the identification information of the vehicle and the identification information of the battery cell unit among the management information for each of the first vehicle and the second vehicle.

According to this configuration, the management device updates the management information. Consequently, the management device can hold correct management information even after the battery cell unit exchange between the first vehicle and the second vehicle.

In the aspect, the battery exchange may be performed per vehicle.

This configuration based on the battery exchange per vehicle eliminates the need for a battery exchange or a battery cell unit exchange, and accordingly can further shorten the time required for the exchange work.

In the aspect, the management device may hold management information setting a correspondence relation between identification information of each of the vehicles and identification information of a user who uses the vehicle, and update, when a vehicle exchange is performed between the first vehicle and the second vehicle, a set content of the correspondence relation between the identification information of the vehicle and the identification information of the user among the management information for the first vehicle and the second vehicle.

According to this configuration, the management device updates the management information. Consequently, the management device can hold correct management information even after the exchange between the first vehicle and the second vehicle.

In the aspect, a management part included in the first vehicle may manage a current battery remaining amount of the first vehicle, and a current location and a destination of the first vehicle, and may suggest a demand for a battery exchange to a user using the first vehicle when the current battery remaining amount of the first vehicle is smaller than an electric power amount required for the first vehicle to reach the destination from the current location.

According to this configuration, the management part included in the first vehicle suggests a demand for the battery exchange to the user thereof. Therefore, the user can recognize a decrease in the battery remaining amount of the vehicle of the user.

A device for managing a sharable electrically driven vehicle according to an aspect of this disclosure is a management device which manages a plurality of shamble electrically driven vehicles each configured to travel by an electric power supplied from a battery. The management device includes: an exchange partner candidate specifying part which specifies, when receiving battery exchange demand information from a first vehicle included in the sharable electrically driven vehicles, at least one exchange partner candidate which is a vehicle providing a battery exchange with the first vehicle; an exchange request information creation part which creates battery exchange request information to be transmitted to the exchange partner candidate; and an exchange instruction information creation part which specifies, when receiving a battery exchange acceptance signal from a second vehicle of the exchange partner candidate, a battery exchange place based on location information about each of the first vehicle and the second vehicle, and creates exchange instruction information including position information about the battery exchange place to be transmitted to the first vehicle and the second vehicle.

This configuration can effectively prevent the first vehicle from suffering an electricity shortage by the battery exchange between the first vehicle having sent the exchange demand information and the second vehicle having sent the exchange acceptance signal. The exchange results in permitting the first vehicle to travel at a long distance exceeding a maximum traveling distance restricted on a battery capacity. Furthermore, the battery exchange between the first vehicle and the second vehicle enables the respective users thereof to complete the exchange work more easily at a shorter time than a supply of an electric power from the second vehicle to the first vehicle connected to each other with a charging cable. Moreover, the cooperation between the users prevents each vehicle from suffering the electricity shortage, and hence, a manager of a sharing service for the electrically driven vehicles can reduce the number of places for arranging support vehicles and the number of the support vehicles. Consequently, the running cost of the service is reduceable.

A computer-readable recording medium recording a program according to an aspect of this disclosure is a computer-readable recording medium recording a program for causing an information processor mounted on a management device, which manages a plurality of shamble electrically driven vehicles each configured to travel by a power supplied from a battery, to serve as: an exchange partner candidate specifying part which specifies, when receiving battery exchange demand information from a first vehicle included in the sharable electrically driven vehicles, at least one exchange partner candidate which is a vehicle providing a battery exchange with the first vehicle; an exchange request information creation part which creates battery exchange request information to be transmitted to the exchange partner candidate; and an exchange instruction information creation part which specifies, when receiving a battery exchange acceptance signal from a second vehicle of the exchange partner candidate, a battery exchange place based on location information about each of the first vehicle and the second vehicle, and creates exchange instruction information including position information about the battery exchange place to be transmitted to the first vehicle and the second vehicle.

This configuration cart effectively prevent the first vehicle from suffering an electricity shortage by the battery exchange between the first vehicle having sent the exchange demand information and the second vehicle having sent the exchange acceptance signal. The exchange results in permitting the first vehicle to travel at a long distance exceeding a maximum traveling distance restricted on a battery capacity. Furthermore, the battery exchange between the first vehicle and the second vehicle enables the respective users thereof to complete the exchange work more easily at a shorter time than a supply of an electric power from the second vehicle to the first Vehicle connected to each other with a charging cable. Moreover, the cooperation between the users prevents each vehicle from suffering the electricity shortage, and hence, a manager of a sharing service for the electrically driven vehicles can reduce the number of places for arranging support vehicles and the number of the support vehicles. Consequently, the running cost of the service is reduceable.

It goes without saying that the computer program according to the aspect of this disclosure is distributable as a computer-readable and nonvolatile recording medium like a CD-ROM, or distributable via a communication network like the Internet.

An embodiment which will be described below represents a specific example of the disclosure, Numeric values, shapes, structural elements, steps, and the order of the steps described below are mere examples, and thus should not be construed to delimit the disclosure. Moreover, structural elements which are not recited in the independent claims each showing the broadest concept among the structural elements in the embodiment are described as selectable structural elements. The respective contents are combinable with each other in the embodiment.

Embodiment

Hereinafter, an embodiment of the disclosure will be described with reference to the accompanying drawings. The elements given the same reference numerals in different drawings are defined to be the same or corresponding elements.

Figure 2:
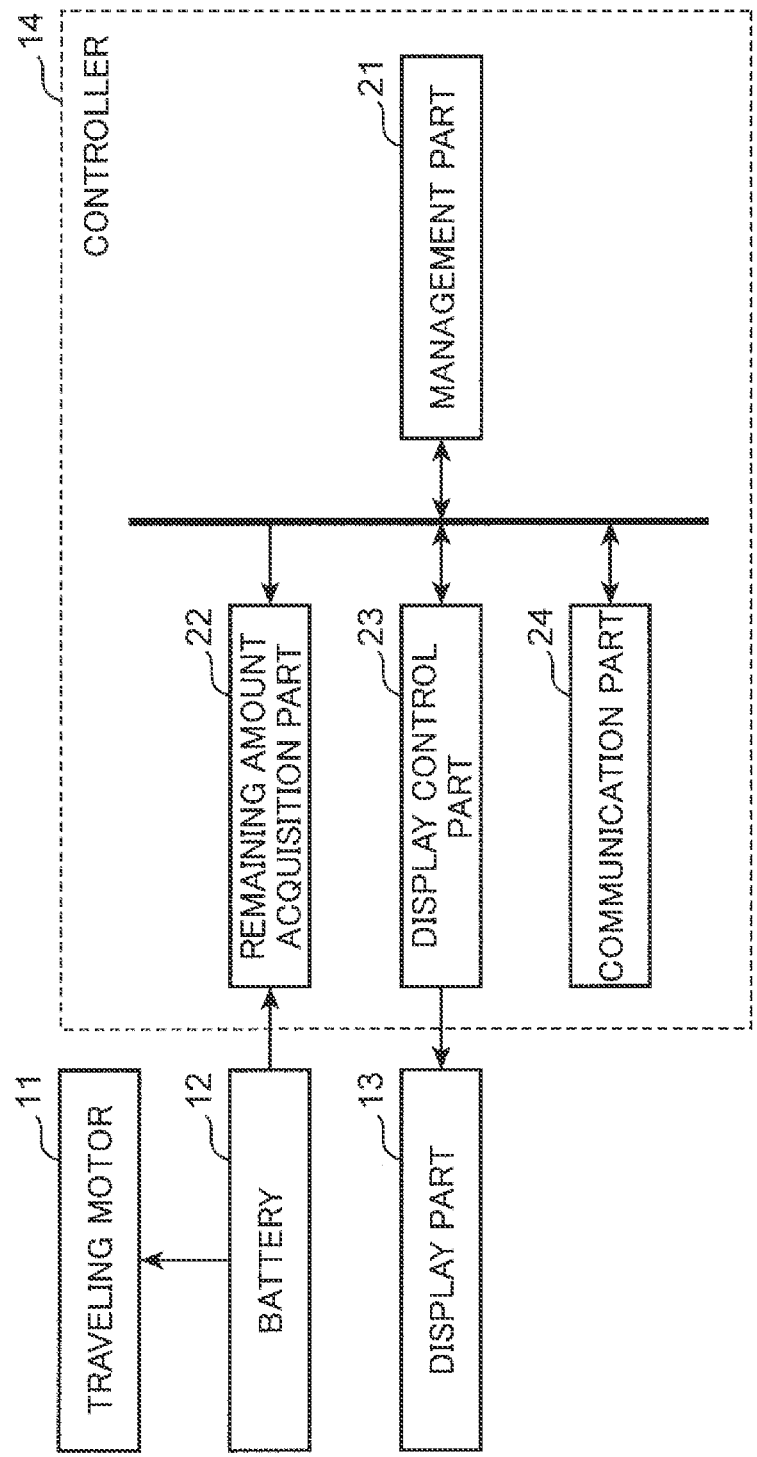
FIG. 2 is a block diagram showing a simplified configuration of the electric scooter.

FIG. 1 shows an overview of a process sequence executed by a management device 2 and electric scooters 3 (3A, 3B) forming a sharing system 1 for an electrically driven vehicle according to an embodiment of the disclosure in the system. The electrically driven vehicle here includes an electric bicycle, an electrically assisted bicycle, an electric kick scooter, and an electric balance scooter, or a tricycle or four-wheeled vehicle of these types, in addition to the electric scooter 3. In the embodiment, the electrically driven vehicle is exemplarily described as the electric scooter 3. FIG. 2 is a block diagram showing a simplified configuration of the electric scooter 3. As shown in FIG. 2, the electric scooter 3 includes a traveling motor 11 driven by an electric power supplied from a battery 12.

In a sharing service for electric scooters 3, a user rents one electric scooter 3 among a plurality of electric scooters 3 parked at a service base, such as a service offering place or a parking lot, and returns the one electric scooter 3 to the same service base or a difference service base within a predetermined period based on a rental fee after freely using the electric scooter 3.

In FIG. 1, the electric scooter 3A has an insufficient battery remaining amount for a remaining traveling distance to a destination thereof, and the electric scooter 3B has a sufficient battery remaining amount. The management device 2 is a server computer on a cloud or other device, and is wirelessly communicable with every electric scooter 3 via a specific wide area network, such as a public switched telephone network. The electric scooter 3 transmits, to the management device 2, location information representing a current location of the scooter at predetermined time intervals of several seconds to several tens of seconds.

A user of the electric scooter 3A can input an exchange demand for a battery 12 thereof when a battery remaining amount reduces, which will be described in detail later. The electric scooter 3A sends exchange demand information to the management device 2 in response to the input of the exchange demand for the battery 12 thereof from the user (step ST1).

Next, the management device 2 specifies, as an exchange partner candidate, at least one electric scooter 3 providing the exchange of the battery 12 of the electric scooter 3A therewith when receiving the exchange demand information from the electric scooter 3A.

Subsequently, the management device 2 creates exchange request information, and transmits the created exchange request information to the specified electric scooter 3 of the exchange partner candidate (step ST2). The electric scooter 3B represents one exchange partner candidate and receives the exchange request information from the management device 2. Here, a user of the electric scooter 3B is considered to accept the exchange request for the battery 12 thereof.

Then, the electric scooter 3B sends an exchange acceptance signal to the management device 2 when receiving an input of an exchange request acceptance from the user thereof (step ST3).

Thereafter, the management device 2 determines specific one electric scooter 3 as an exchange partner of the electric scooter 3A for the exchange of the battery 12 thereof when receiving the exchange acceptance signal from at least one exchange partner candidate. Here, the electric scooter 3B is determined as the exchange partner.

Subsequently, the management device 2 specifies, based on location information about each of the electric scooters 3A, 3B, a meeting place where the electric scooters 3A, 3B meet each other, and creates exchange instruction information including position information about the meeting place.

Then, the management device 2 transmits the created exchange instruction information to the electric scooters 3A, 3B (step ST4).

The respective users of the electric scooters 3A, 3B move to the meeting place designated by the received exchange instruction information by the electric scooters 3A, 3B, respectively. The users meet each other at the meeting place to exchange the battery 12 of the electric scooter 3A with the battery 12 of the electric scooter 3B.

After completion of the work of exchanging the batteries 12, each of the electric scooters 3A, 3B sends an exchange completion signal to the management device 2 when receiving an input of an exchange completion from the corresponding user (step ST5).

Subsequently, the management device 2 updates management information 78 (see FIG. 21) held by itself when receiving the exchange completion signal from each of the electric scooters 3A, 3B.

Then, the management device 2 creates reward information for giving a predetermined reward to the user of the electric scooter 3B, and transmits the created reward information to the electric scooter 3B (step ST6).

Referring to FIG. 2, the electric scooter 3 includes the traveling motor 11, the battery 12, a display part 13, and a controller 14. The display part 13 has an LED indicator and a liquid crystal display arranged on a manipulation panel of the electric scooter 3. The controller 14 includes a management part 21, a remaining amount acquisition part 22, a display control part 23, and a communication part 24. The remaining amount acquisition part 22 acquires, from the battery 12, data indicating a current battery remaining amount. The display control part 23 controls displaying of various kinds of information on the display part 13. The communication part 24 is wirelessly communicable with a portable terminal device 4 to be described later by a specific near field communication way, e.g., Bluetooth (registered trademark) or Wi-Fi. The management part 21 totally manages and controls operations of the remaining amount acquisition part 22, the display control part 23, and the communication part 24.

Figure 3:
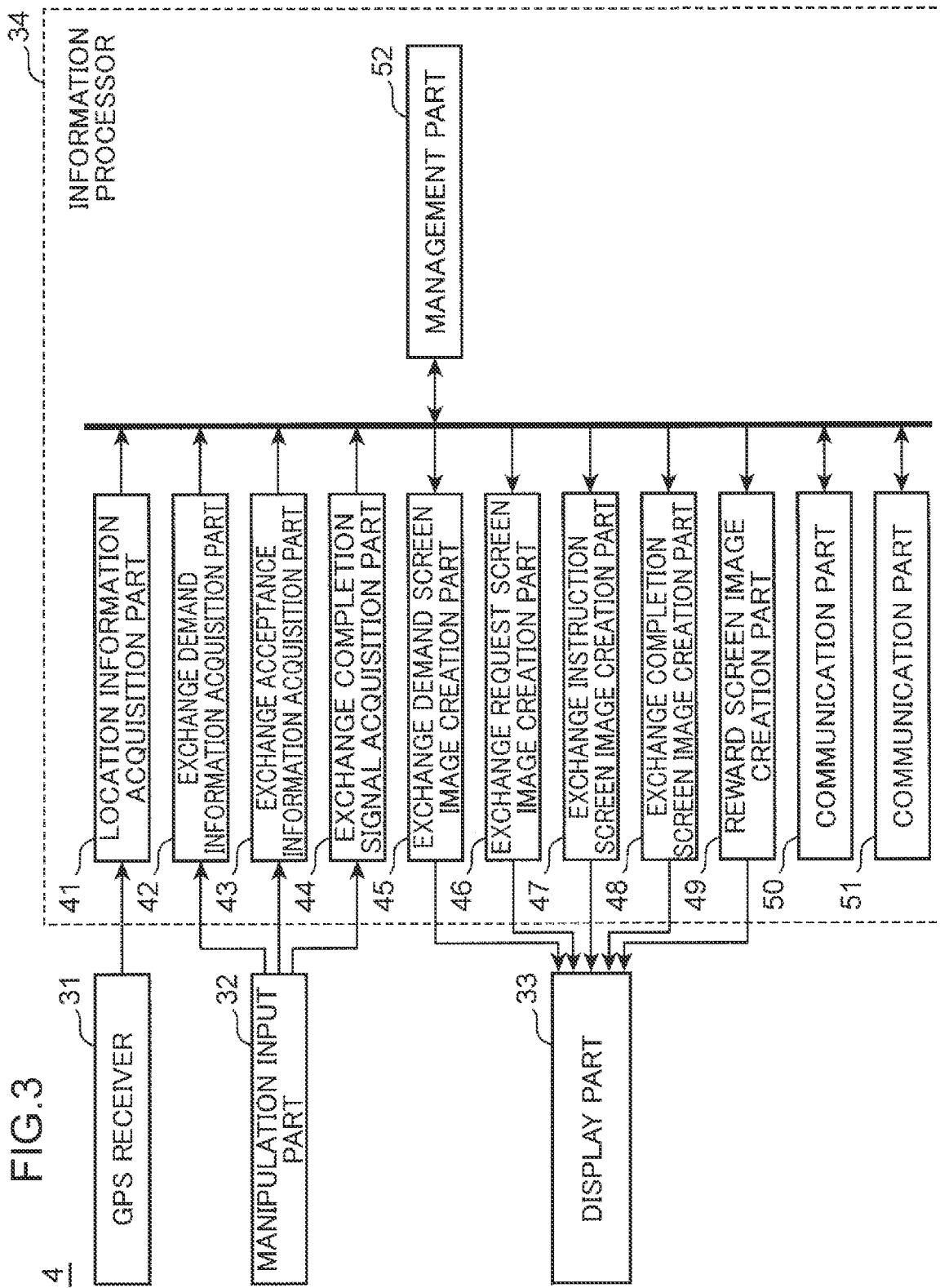
FIG. 3 shows a simplified configuration of a portable terminal device carried by a user of the electric scooter.

FIG. 3 shows a simplified configuration of the portable terminal device 4 carried by the user of the electric scooter 3. The portable terminal device 4 is a smartphone or a tablet owned by the user. However, the portable terminal device 4 may be a dedicated device rent together with the electric scooter 3 from the manager. Alternatively, the electric scooter 3 may have the same operability as the portable terminal device 4. It is not important for the management device 2 whether the electric scooter 3 is integrated with or independent of the portable terminal device 4. The operability of the portable terminal device 4 may serve as a part of the operability of the electric scooter 3. Therefore, FIG. 1 shows as though the management device 2 and the electric scooter 3 would directly send and receive information therebetween.

The portable terminal device 4 includes a UPS receiver 31, a manipulation input part 32, a display part 33, and an information processor 34. For instance, the display part 33 serves as a liquid crystal display included in the portable terminal device 4, and the manipulation input part 32 serves as a touch screen of the liquid crystal display.

The information processor 34 includes a location information acquisition part 41, an exchange demand information acquisition part 42, an exchange acceptance information acquisition part 43, an exchange completion signal acquisition part 44, an exchange demand screen image creation part 45, an exchange request screen image creation part 46, an exchange instruction screen image creation part 47, an exchange completion screen image creation part 48, a reward screen image creation part 49, communication parts 50, 51, and a management part 52. Each of the operative parts included in the information processor 34 may be established as software when an information processor like a CPU executes a program read from a non-volatile recording medium like a ROM, or may be established as hardware by using a dedicated circuit like a FPGA.

The location information acquisition part 41 acquires, based on a UPS signal input from the GPS receiver 31, location information representing a current location of the portable terminal device 4.

Figure 7:
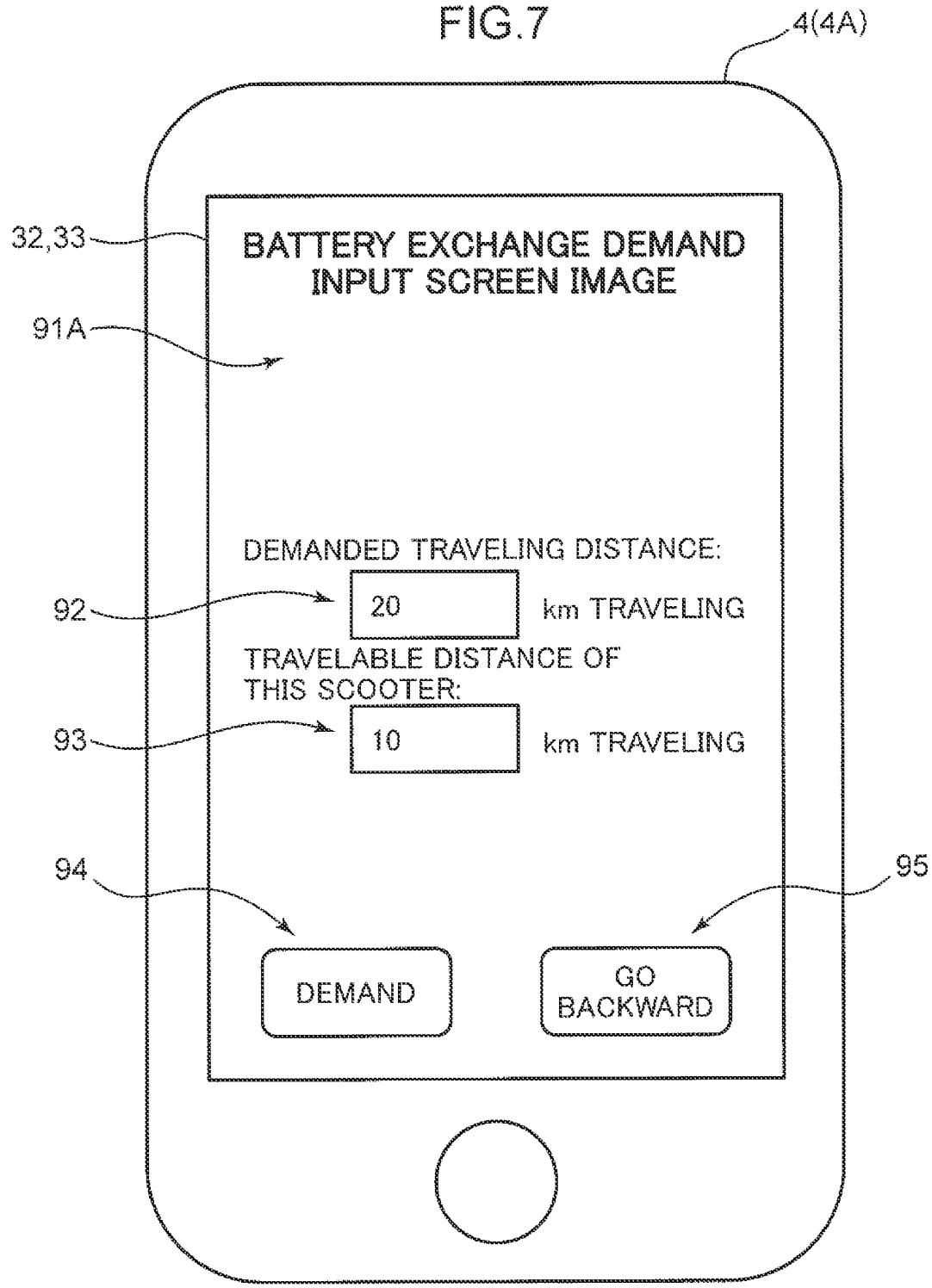
FIG. 7 shows an example of a display state of a battery exchange demand input screen image onto the display part.

The exchange demand screen image creation part 45 creates a battery exchange demand input screen image 91A shown in FIG. 7, and the display part 33 displays the screen image 91A thereon. The exchange demand information acquisition part 42 creates exchange demand information by acquiring information input from the manipulation input part 32 by a user in the state where the battery exchange demand input screen image 91A is displayed on the display part The exchange request screen image creation part 46 creates a battery exchange request screen image 101 shown in FIG. 11, and the display part 33 displays the screen image 101 thereon. The exchange acceptance information acquisition part 43 creates an exchange acceptance signal by acquiring information input from the manipulation input part 32 by the user in the state where the battery exchange request screen image 101 is displayed on the display part 33.

Figure 14:
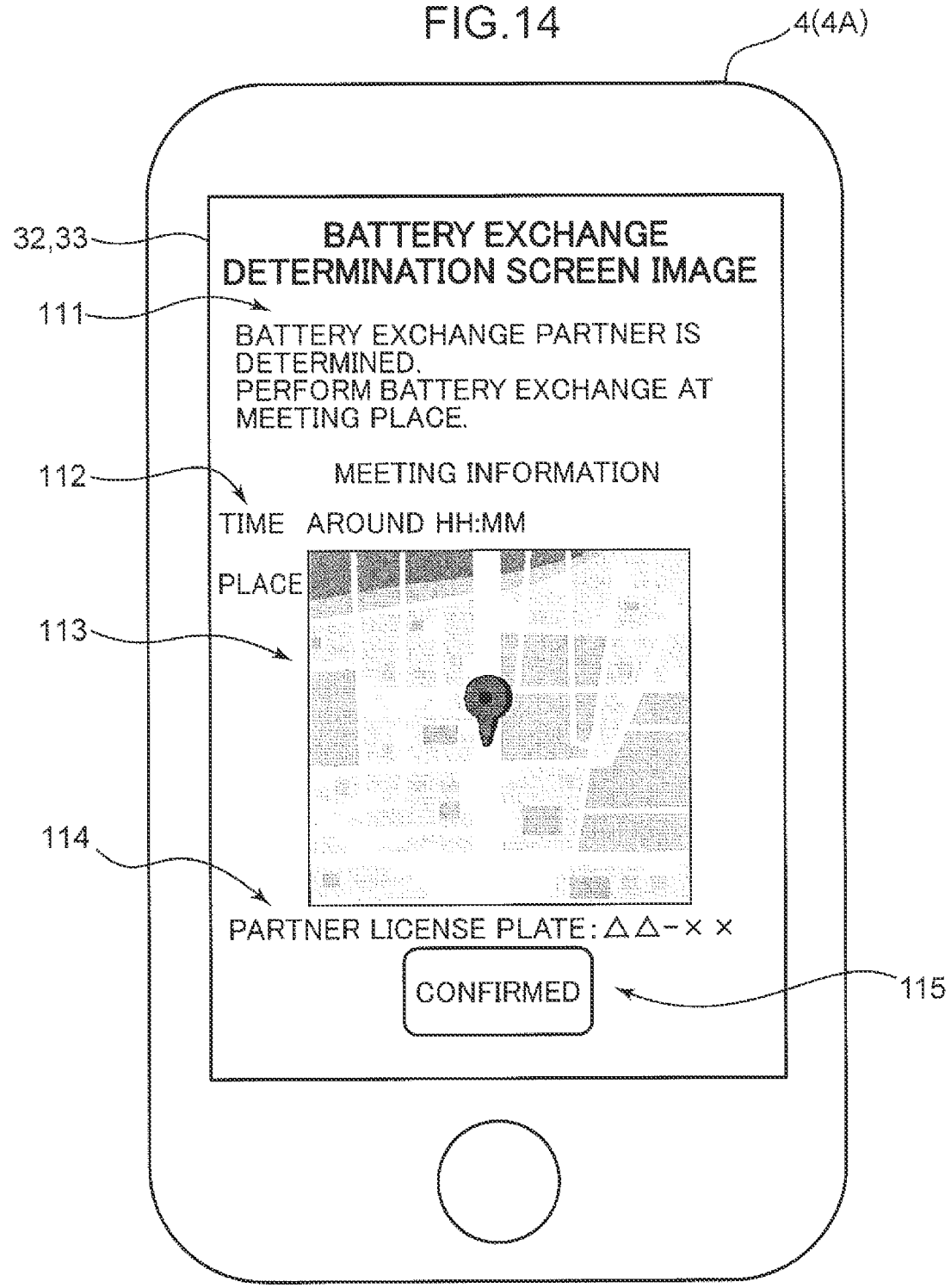
FIG. 14 shows an example of a display state of a battery exchange determination screen image onto the display part.
Figure 17:
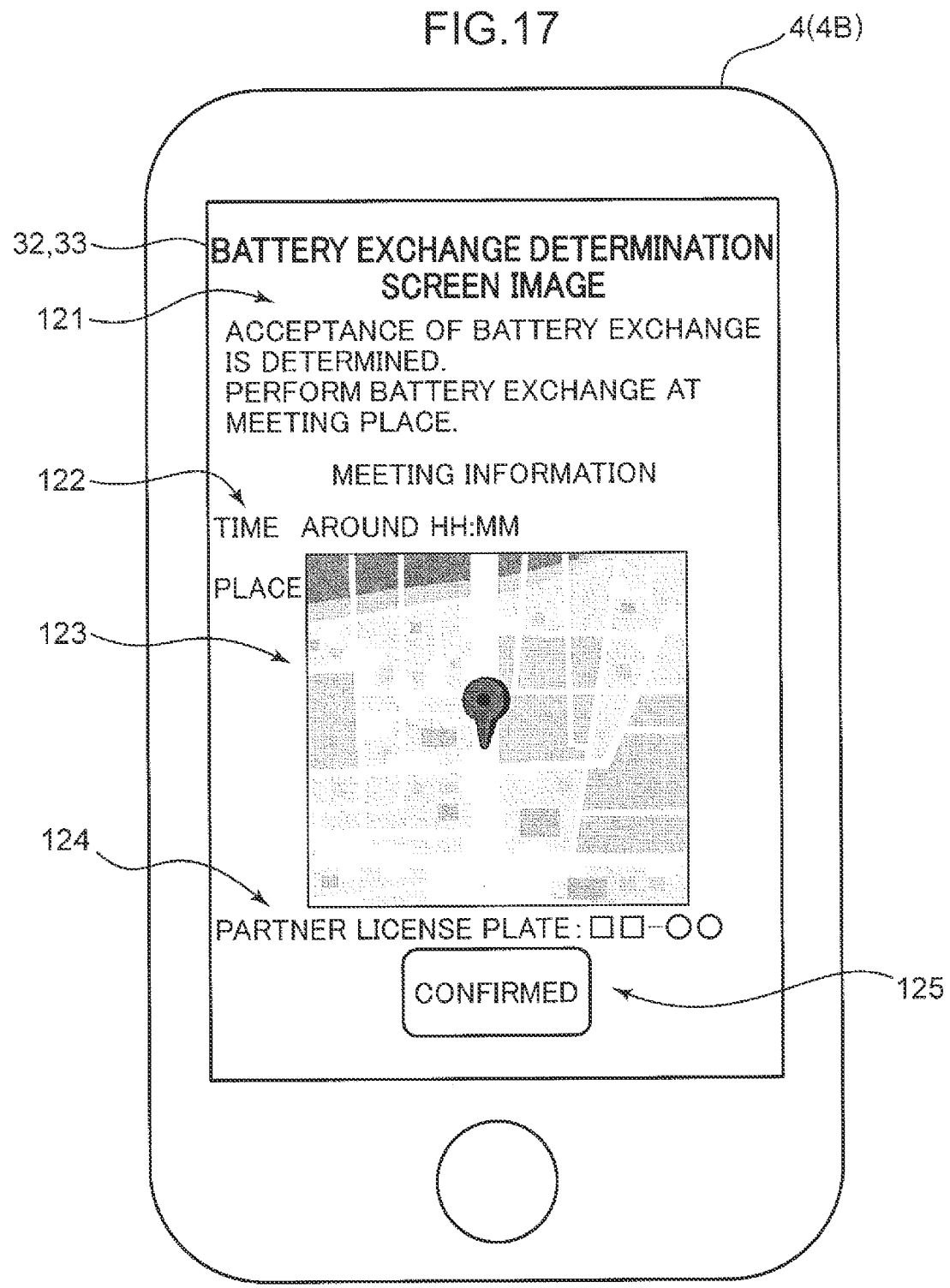
FIG. 17 shows an example of a display state of a battery exchange determination screen image onto the display part.

The exchange instruction screen image creation part 47 is configured to create battery exchange determination screen images 111, 121 respectively shown in FIGS. 14 and 17, and the display part 33 is configured to display the screen images 111, 121 thereon.

Figure 19:
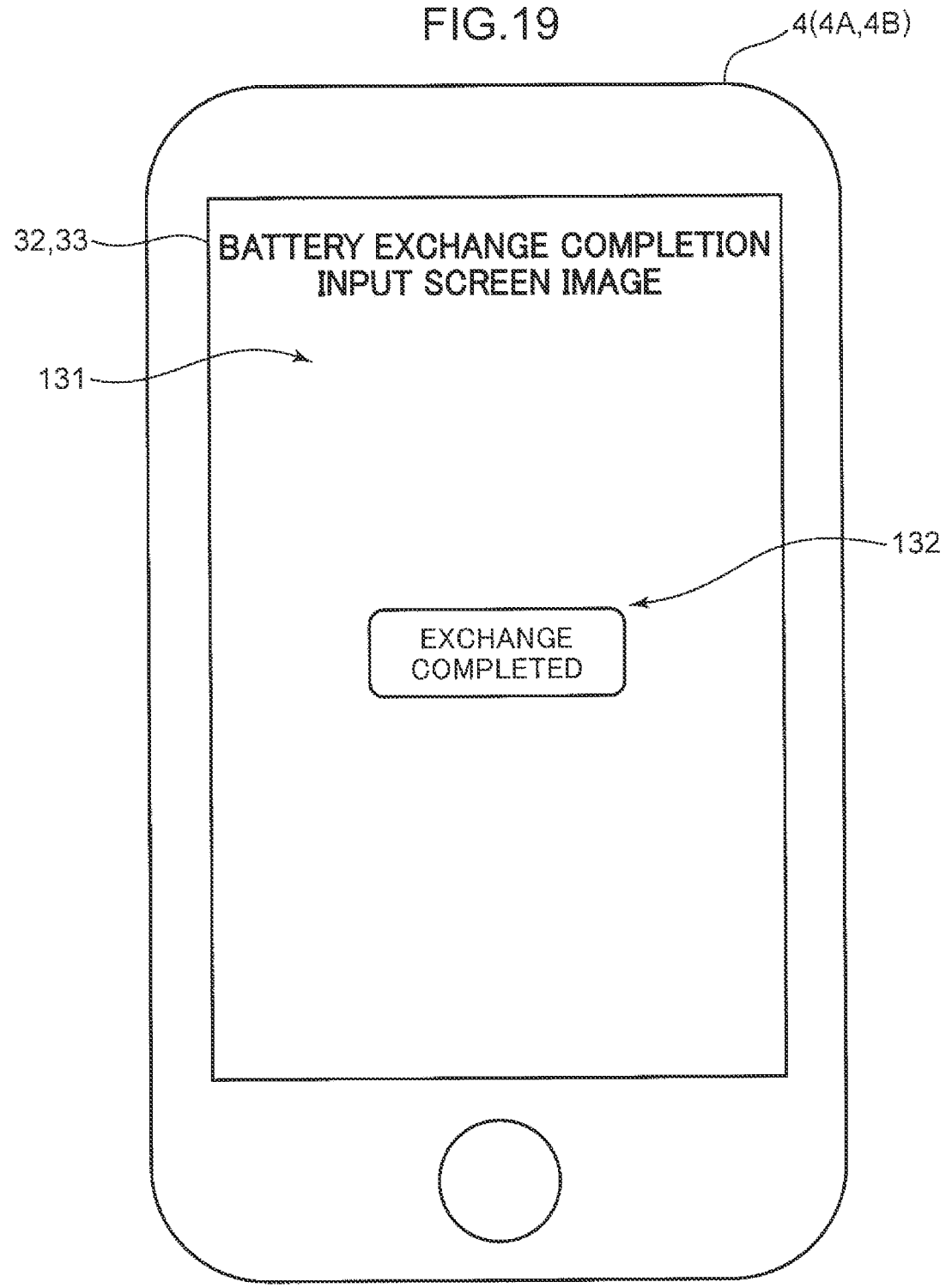
FIG. 19 shows an example of a display state of a battery exchange completion input screen image onto the display part.

The exchange completion screen image creation part 48 creates a battery exchange completion input screen image 131 shown in FIG. 19, and the display part 33 displays the screen image 131 thereon. The exchange completion signal acquisition part 44 creates an exchange completion signal by acquiring information input from the manipulation input part 32 by the user in the state where the battery exchange completion input screen image 131 is displayed on the display part 33.

The communication part 50 wirelessly communicates with the communication part 24 of the electric scooter 3 by the near field communication way. The communication part 51 is wirelessly communicable with the management device 2 via the wide area network. The management part 52 totally manages and controls operations of the location information acquisition part 41, the exchange demand information acquisition part 42, the exchange acceptance information acquisition part 43, the exchange completion signal acquisition part 44, the exchange demand screen image creation part 45, the exchange request screen image creation part 46, the exchange instruction screen image creation part 47, the exchange completion screen image creation part 48, the reward screen image creation part 49, and the communication parts 50, 51.

Figure 4:
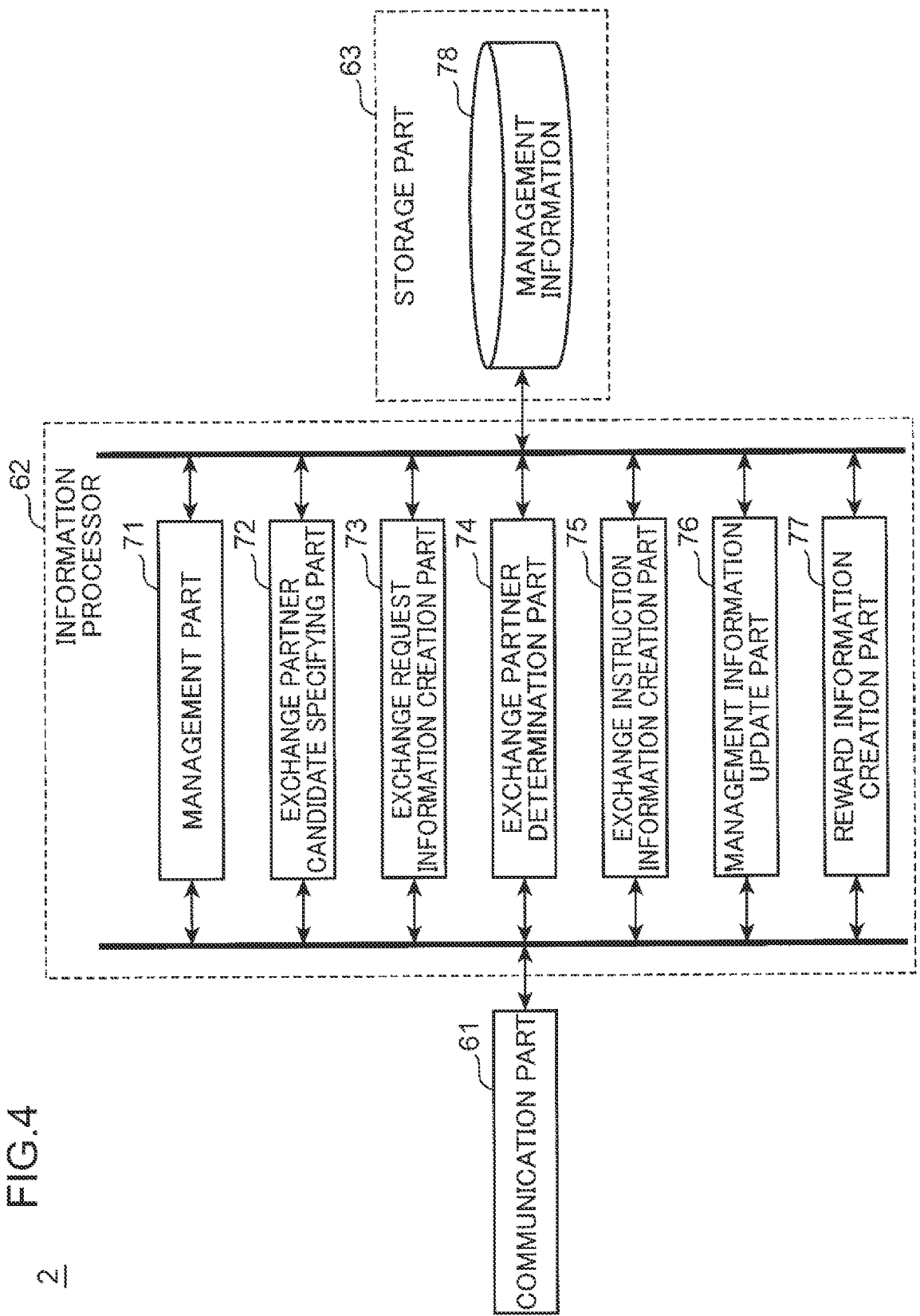
FIG. 4 shows a simplified configuration of a management device.

FIG. 4 shows a simplified configuration of the management device 2. The management device 2 includes a communication part 61, an information processor 62, and a storage part 63. The communication part 61 wirelessly communicates with the communication part 51 of the portable terminal device 4 via the wide area network. Thus, strictly speaking, the management device 2 communicates with the portable terminal device 4. However, the operability of the portable terminal device 4 may serve as a part of the operability of the electric scooter 3 as aforementioned, and therefore the management device 2 is understandable to communicate with the electric scooter 3 as well. The storage part 63 includes an HDD or an SSD, and stores the management information 78.

The information processor 62 includes a management part 71, an exchange partner candidate specifying part 72, an exchange request information creation part 73, an exchange partner determination part 74, an exchange instruction information creation part 75, a management information update part 76, and a reward information creation part 77. Each of the operative parts included in the information processor 62 may be established as software when an information processor like a CPU executes a computer program read from a non-volatile recording medium like a ROM, or may be established as hardware by using a dedicated circuit like a FPGA.

When the exchange demand information is received in the management device 2 from the electric scooter 3A, the exchange partner candidate specifying part 72 specifies, as an exchange partner candidate, at least one electric scooter 3 providing an exchange of the battery 12 of the electric scooter 3A therewith. The exchange request information creation part 73 creates exchange request information to be transmitted to the exchange partner candidate. When an exchange acceptance signal is received in the management device 2 from the at least one exchange partner candidate, the exchange partner determination part 74 determines specific one electric scooter 3, as an exchange partner, for the exchange of the battery 12 of the electric scooter 3A therewith. The exchange instruction information creation part 75 specifies, based on location information about each of the electric scooters 3A, 3B, a meeting place where the electric scooters 3A, 3B meet each other, and creates exchange instruction information including position information about the meeting place. The management information update part 76 updates the management information 78 stored in the storage part 63 when receiving an exchange completion signal from each of the electric scooters 3A, 3B. The reward information creation part 77 creates reward information for giving a predetermined reward to the user of the electric scooter 3B. Details of operability of each processing part will be sequentially addressed in explanation of flowcharts to be described later with reference to an example of a screen image created by each processing part.

The management part 71 totally manages and controls operations of the exchange partner candidate specifying part 72, the exchange request information creation part 73, the exchange partner determination part 74, the exchange instruction information creation part 75, the management information update part 76, and the reward information creation part 77.

Figure 5:
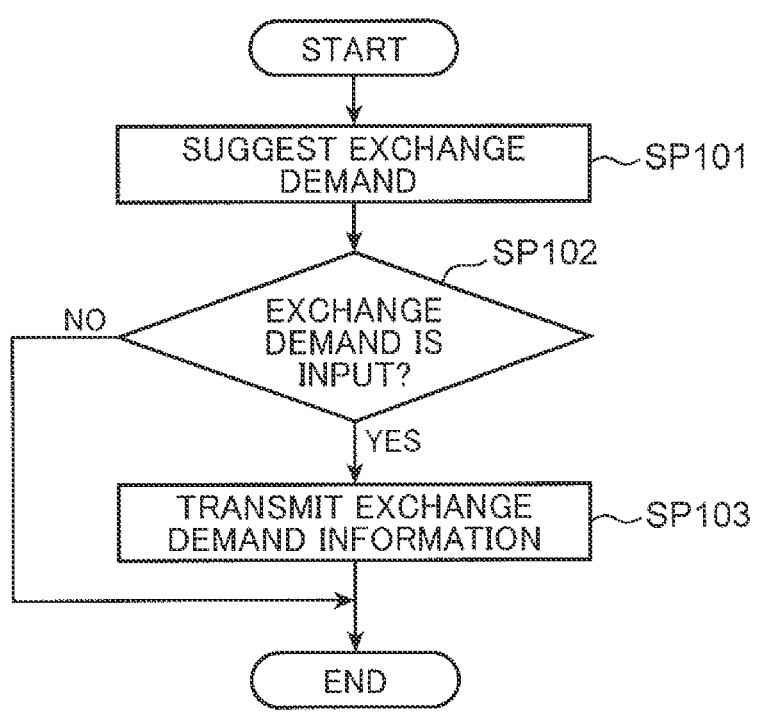
FIG. 5 is a flowchart showing contents of steps until transmission of exchange demand information, in the process sequence shown in FIG. 1, for the electric scooter.

FIG. 5 is a flowchart showing contents of steps until transmission of the exchange demand information, in the process sequence shown in FIG. 1, for the electric scooter 3A.

Referring to FIGS. 2 and 3, the management part 52 of the portable terminal device 4 manages a current battery remaining amount, a current location, and a destination of the electric scooter 3A. Data indicating the current battery remaining amount of the electric scooter 3A is input from the remaining amount acquisition part 22 to the management part 52 via the communication parts 24, 50. Location information representing the current location of the electric scooter 3A is input from the location information acquisition part 41 to the management part 52. Information about the destination of the electric scooter 3A is input from the manipulation input part 32 to the management part 52 through a manipulation by the user thereof. The management part 52 calculates, based on its held map data, a required traveling distance from the current location to the destination, and calculates, by converting the required traveling distance to a power amount, the power amount required for the electric scooter 3A to reach the destination from the current location.

Referring to FIG. 5, first, the management part 52 suggests, in step SP101, an exchange demand for the battery 12 of the electric scooter 3A to the user using the electric scooter 3A when the current battery remaining amount of the electric scooter 3A is smaller than a power amount required for the electric scooter 3A to reach the destination from the current location. The suggestion is executed through information displaying onto the display parts 13, 33. The management part 52 permits the user of the electric scooter 3A to recognize a decrease in the battery remaining amount thereof by suggesting the exchange demand for the battery 12 to the user.

Figure 6:
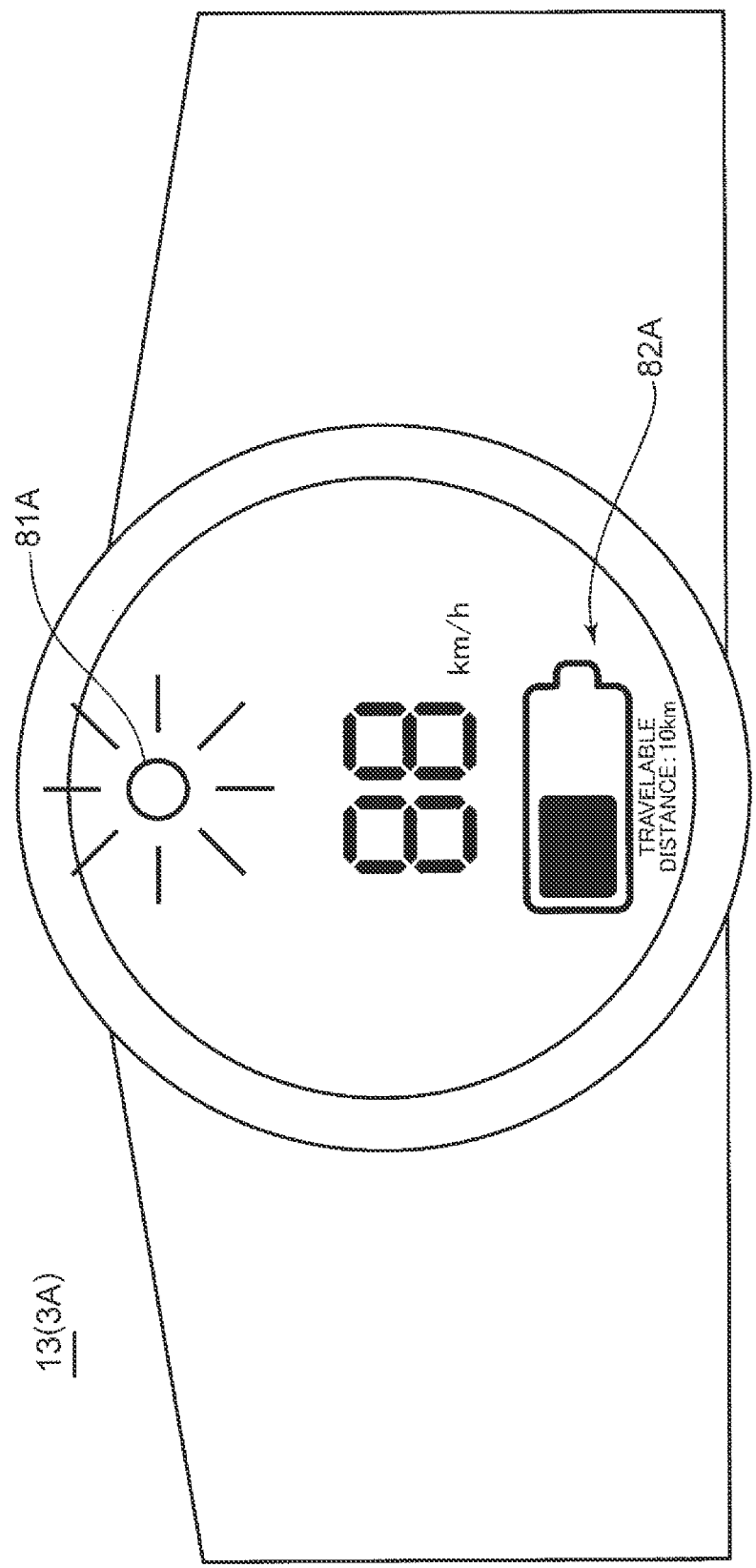
FIG. 6 shows an example of a display state of a suggestion onto a display part.

FIG. 6 shows an example of a display state of the suggestion onto the display part 13. The management part 52 causes the display part 13 to display an indicator 81A which is turned on, for example, in red for encouraging the user to confirm contents displayed on the display part 33 of the portable terminal device 4. The management part 52 further calculates a travelable distance of the electric scooter 3A corresponding to the current battery remaining amount, and causes the display part 13 to display a shape 82A showing the current battery remaining amount having reduced as well as the travelable distance (10 km in the example) of this scooter.

FIG. 7 shows an example of a display state of the battery exchange demand input screen image 91A onto the display part 33. The exchange demand screen image creation part 45 creates, based on an image creation instruction input from the management part 52, the battery exchange demand input screen image 91A shown in FIG. 7. The exchange demand screen image creation part 45 displays the created battery exchange demand input screen image 91A on the display part 33.

The battery exchange demand input screen image 91A includes input cells 92, 93 for allowing the user of the electric scooter 3A to input necessary information thereinto, an execution button 94 to be tapped in execution of the exchange demand, and a cancelation button 95 to be tapped in cancelation of the exchange demand.

The management device 2 may suggest the exchange demand for the battery 12 to the user in place of the management part 52 by periodically receiving, from each electric scooter 3, information about a destination and a battery remaining amount of the electric scooter 3, and managing the information.

The user of the electric scooter 3A inputs, into the input cell 92, a demanded traveling distance which corresponds to a battery remaining amount demanded by the user and indicates a traveling distance required for the electric scooter 3A (or longer distance) to reach the destination from the current location. In this example, the input demanded traveling distance indicates "20" km. The input of the demanded traveling distance into the input cell 92 may be manually performed by the user with reference to specific map data in a portable terminal device 4A, or may be automatically performed by the management part 52 with reference to the information about the current location and the destination of the electric scooter 3A.

Moreover, the user of the electric scooter 3A inputs, into the input cell 93, a travelable distance of the scooter thereof corresponding to the battery remaining amount. In this example, the input travelable distance of the scooter indicates "10" km. The input of the travelable distance into the input cell 93 may be manually performed by the user having confirmed the travelable distance displayed on the display part 13, or may be automatically performed by the management part 52 having converted the battery remaining amount input from the remaining amount acquisition part 22 to a distance.

A communication part 51 included in the portable terminal device 4A transmits the exchange demand information to the management device 2 in response to tapping of the execution button 94 by the user of the electric scooter 3A having completed the input of the necessary information into the input cells 92, 93.

Referring to FIG. 5, in step SP102, the exchange demand information acquisition part 42 determines, based on the tapping or no tapping of the execution button 94 on the battery exchange demand input screen image 91A by the user, whether the exchange demand is input.

When the execution button 94 is tapped by the user (YES in step SP102), the exchange demand information acquisition part 42 determines that the exchange demand information is input and the communication part 51 transmits the exchange demand information to the management device 2 in the subsequent step SP103. The exchange demand information includes identification information (vehicle ID) of the electric scooter 3A, and information about the demanded traveling distance and the travelable distance of this scooter input from the battery exchange demand input screen image 91A. Conversely, when the cancelation button 95 is tapped by the user (NO in step SP102), the process is finished without transmitting the exchange demand information.

Figure 8:
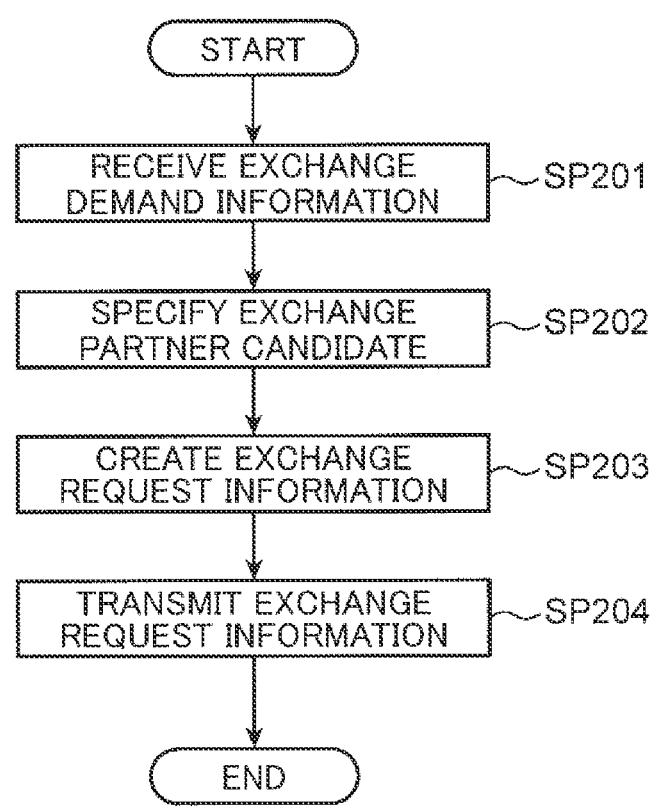
FIG. 8 is a flowchart showing contents of steps until transmission of exchange request information, in the process sequence shown in FIG. 1, as executed in the management device.

FIG. 8 is a flowchart showing contents of steps until transmission of the exchange request information, in the process sequence shown in FIG. 1, as executed in the management device 2.

First, in step SP201, the communication part 61 of the management device 2 receives exchange demand information from the portable terminal device 4A carried by the user of the electric scooter 3A.

Next, in step SP202, the exchange partner candidate specifying part 72 specifies, as an exchange partner candidate, at least one electric scooter 3 providing an exchange of the battery 12 of the electric scooter 3A therewith.

As described above, the management device 2 periodically receives, from each electric scooter 3, location information representing a current location thereof. At a time when the exchange demand information is received from the electric scooter 3A, the exchange partner candidate specifying part 72 specifies, as the exchange partner candidate, every electric scooter 3 whose distance to the electric scooter 3A indicates a predetermined value (e.g., 5 km) or smaller, or a predetermined number of (e.g., five) electric scooters 3 whose distances thereto are closer in this order. Consequently, the management device 2 can easily specify an exchange partner candidate.

Alternatively, the management device 2 receives, from each electric scooter 3, information about a destination of each electric scooter 3, and manages the information. In this manner, the management device 2 can estimate, based on the current location and the destination, a traveling route of the electric scooter 3. The exchange partner candidate specifying part 72 may specify, based on the estimated traveling route of the electric scooter 3, the exchange partner candidate. Specifically, the exchange partner candidate specifying part 72 specifies, as the exchange partner candidate, every electric scooter 3 whose distance to the electric scooter 3A indicates a predetermined value (e.g., 5 km) or smaller, or a predetermined, number of five) electric scooters 3 whose distances thereto are closer in this order in a lapse of a predetermined time (e.g., thirty minutes) after a time of receiving the exchange demand information from the electric scooter 3A. Consequently, the management device 2 can specify an exchange partner candidate which is highly likely to accept an exchange request for the battery 12.

Next, the exchange request information creation part 73 creates, in step SP203, exchange request information to be transmitted to the exchange partner candidate. The exchange request information includes information about a requested traveling distance and a partner travelable distance respectively corresponding to the demanded traveling distance (20 km in the example) and the travelable distance (10 km in the example) included in the exchange demand information received from the electric scooter 3A.

Subsequently, the communication part 61 transmits, in step SP204, the exchange request information created in step SP203 to the portable terminal device 4 carried by the user of the electric scooter 3 of the exchange partner candidate specified in step SP202, In the description described below, electric scooters 3 of exchange partner candidates include the electric scooter 3B.

In a case where a battery station for storing (and charging) a plurality of batteries 12 is prepared, the management device 2 may guide the user of the electric scooter 3A to the battery station for a battery exchange.

Figure 26:
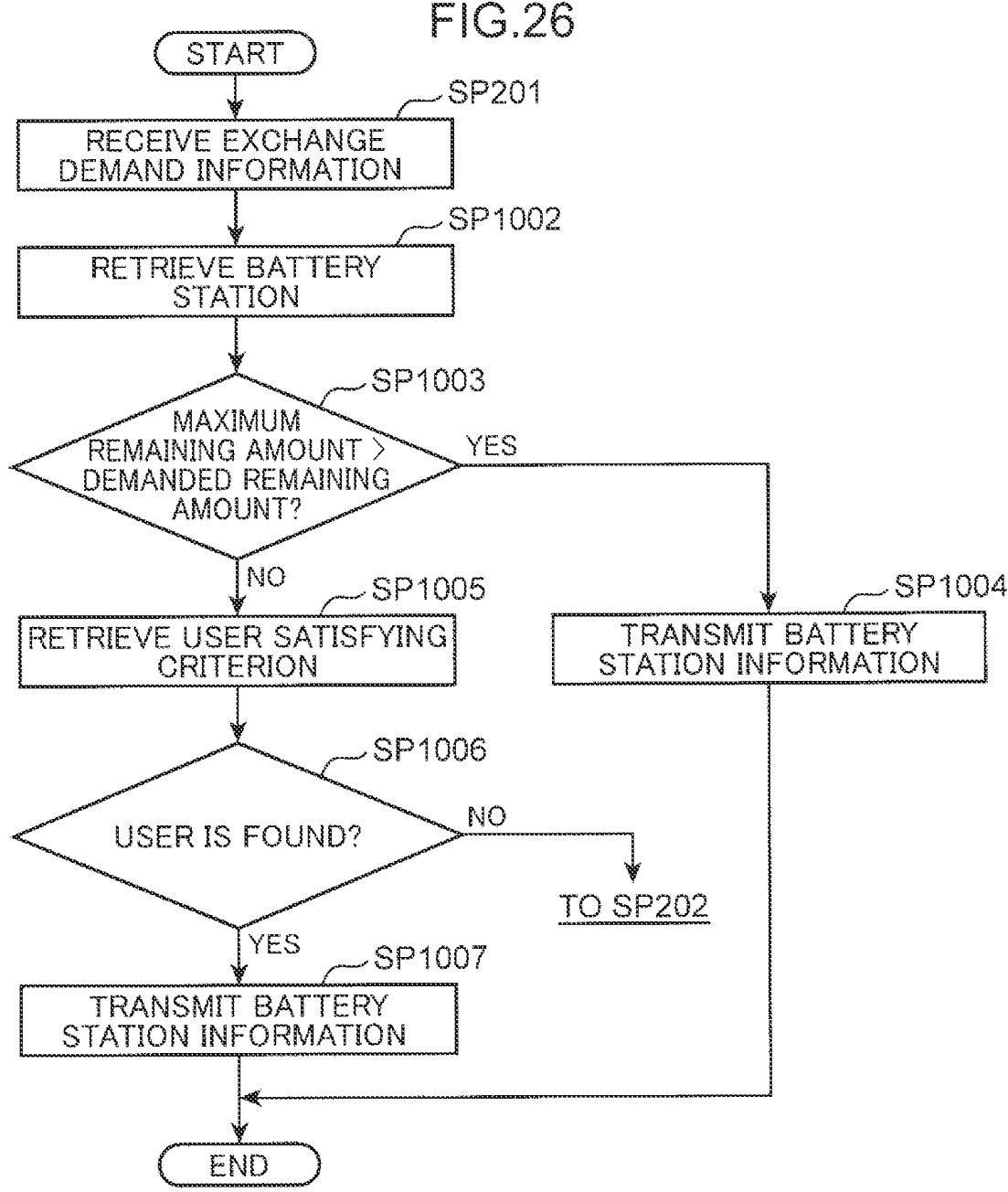
FIG. 26 is a flowchart showing contents of steps by the management device.

FIG. 26 is a flowchart showing contents of steps by the management device 2 in the case where the battery station is prepared. In the following example, the management device 2 collects and holds position information about a plurality of battery stations, remaining amount information indicating a battery remaining amount of each battery 12 stored in each of the battery stations, remaining amount information about each battery 12 used by, each electric scooter 3, and current location information and destination information about the electric scooter 3.

First, the management device 2 receives, in step SP201, exchange demand information from the portable terminal device 4A carried by the user of the electric scooter 3A in the same manner as described above.

Next, the management device 2 retrieves, in step SP1002, a battery station closest to the current location of the electric scooter 3A.

Subsequently, the management device 2 determines, in step SP1003, whether the largest remaining amount of a battery 12 among the batteries 12 stored at the battery station is greater than a demanded remaining amount (battery remaining amount converted from a demanded traveling distance) of the electric scooter 3A.

When the largest remaining amount is greater than the demanded remaining amount (YES in step SP1003), the management device 2 transmits, in the subsequent step SP1004, the position information about the battery station, as an exchange place for the battery 12, to the portable terminal device 4A carried by the user of the electric scooter 3A. The user moves to the battery station by the electric scooter 3A, and exchanges the battery 12 of the electric scouter 3A with the battery 12 having the largest remaining amount there.

When the largest remaining amount is equal to or smaller than the demanded amount (NO in step SP1003), the management device 2 retrieves, in the subsequent step SP1005, a user (electric scooter 3) satisfying a predetermined criterion. The predetermined criterion is that the user or scooter has a battery remaining amount greater than the largest battery remaining amount at the battery station, is located closer to the battery station than the electric scooter 3A, and can reach the destination of the user or scooter by using the battery 12 having the largest remaining amount at the battery station.

Subsequently, the management device 2 determines, in step SP1006, whether such a user as satisfying the predetermined criterion is found.

When a specific user satisfying the predetermined criterion is found (YES in step SP1006), in the subsequent step SP1007, the management device 2 transmits a battery exchange request to a portable terminal device 4 carried by the found user, and further transmits the position information about the battery station serving as the exchange place for the battery 12 to the portable terminal device 4 carried by the user (hereinafter, referred to as an "accepting user"). The accepting user moves to the battery station, and provides the battery 12 thereof and obtains the battery 12 having the largest remaining amount instead. Moreover, the management device 2 transmits, to the portable terminal device 4A carried by the user of the electric scooter 3A, the position information about the battery station as the exchange place for the battery 12 thereof. The user of the electric scooter 3A moves to the battery station, and exchanges the battery 12 thereof with the provided battery 12 from the accepting user.

In a case where no user is found to satisfy the predetermined criterion (NO in step SP1006), the management device 2 executes the steps from step SP202 shown in FIG. 8. In another case where a user satisfying the predetermined criterion is found but the user refuses to accept the battery exchange, the management device 2 executes steps from step SP202 shown in FIG. 8 as well.

The battery exchange the battery station permits unacquainted users to avoid directly meeting each other.

Figure 9:
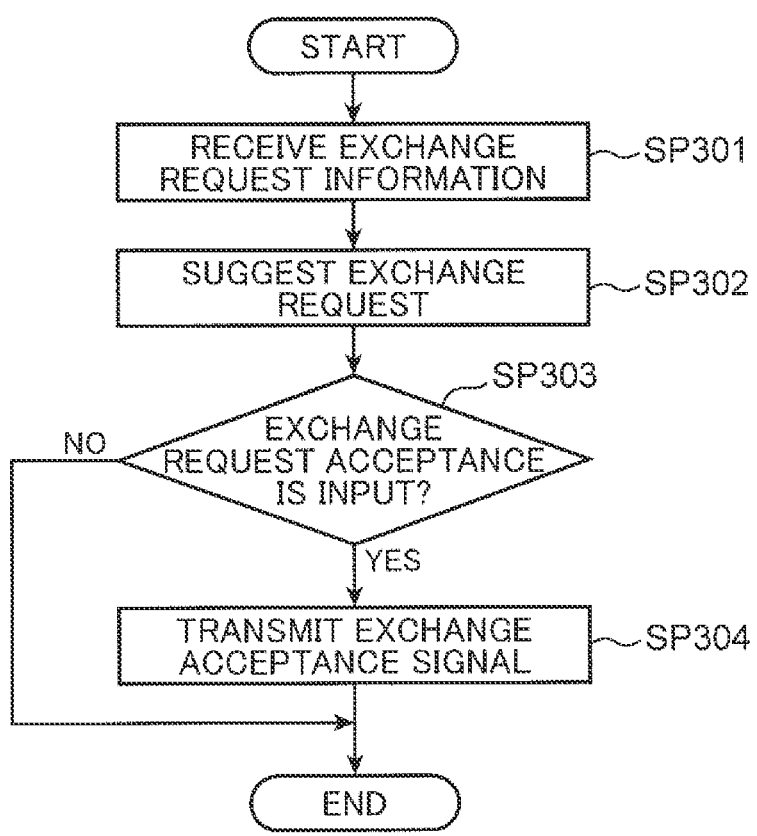
FIG. 9 is a flowchart showing contents of steps until transmission of an exchange acceptance signal, in the process sequence shown in FIG. 1, for the electric scooter.

FIG. 9 is a flowchart showing contents of steps until transmission of an exchange acceptance signal, in the process sequence shown in FIG. 1, for the electric scooter 3B.

First, in step SP301, a communication part 51 included in a portable terminal device 4B carried by the user of the electric scooter 3B receives the exchange request information from the management device 2. The communication part 51 inputs the received exchange request information to the management part 52 and the exchange request screen image creation part 46.

Next, the management part 52 suggests, in step SP302, receipt of the exchange request information to the user using the electric scooter 3B. The suggestion is executed through information displaying onto the display parts 13, 33.

Figure 10:
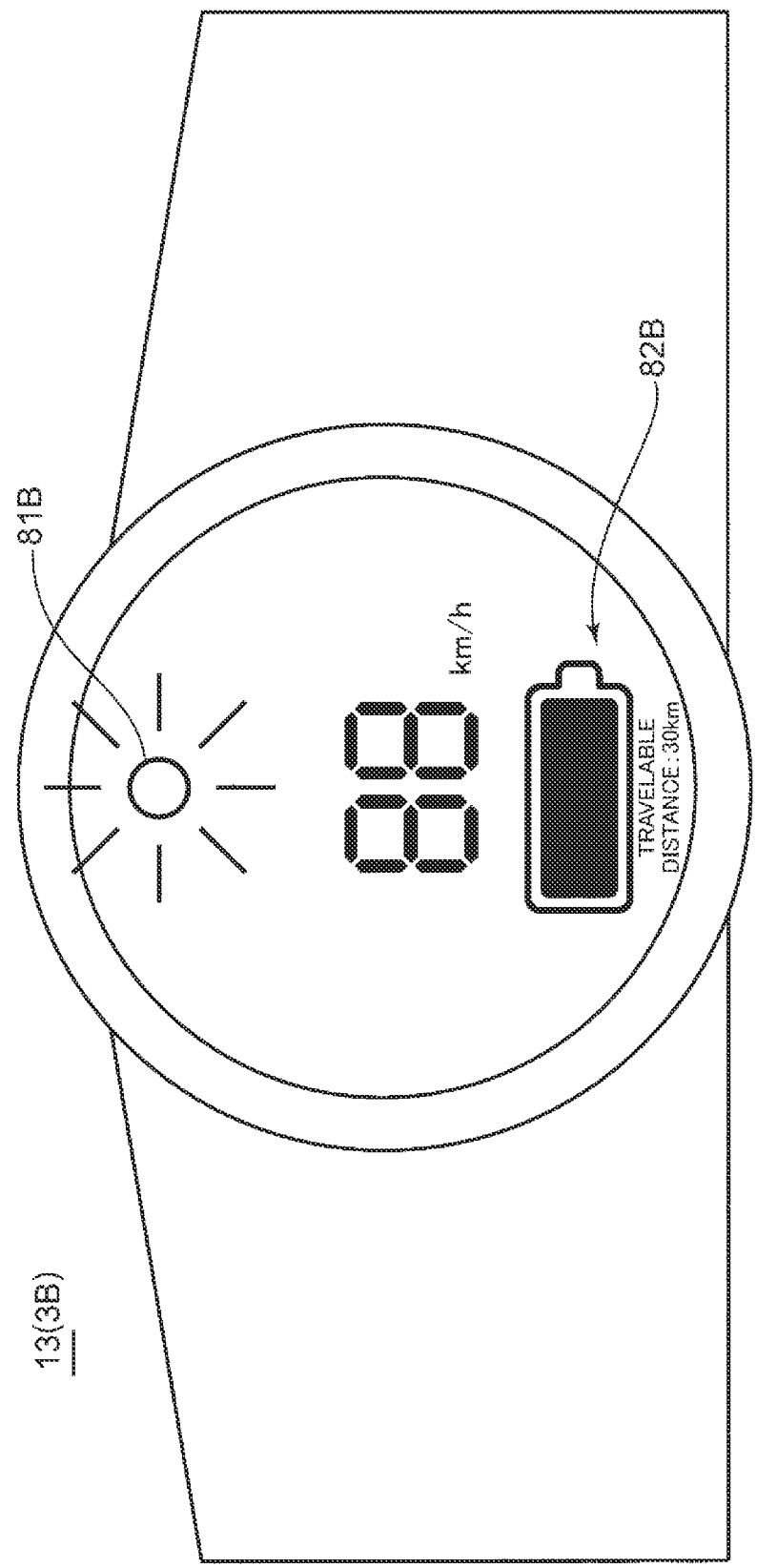
FIG. 10 shows an example of a display state of a suggestion onto a display part.

FIG. 10 shows an example of a display state of the suggestion onto the display part 13. The management part 52 causes the display part 13 to display an indicator 81B which is turned on, for example, in green for encouraging the user to confirm contents displayed on the display part 33 of the portable terminal device 4B. The management part 52 further calculates a travelable distance of the electric scooter 38 corresponding to a current battery remaining amount thereof, and causes the display part 13 to display a shape 8213 showing a current battery remaining amount as well as the travelable distance (30 km in this case) of this scooter.

Figure 11:
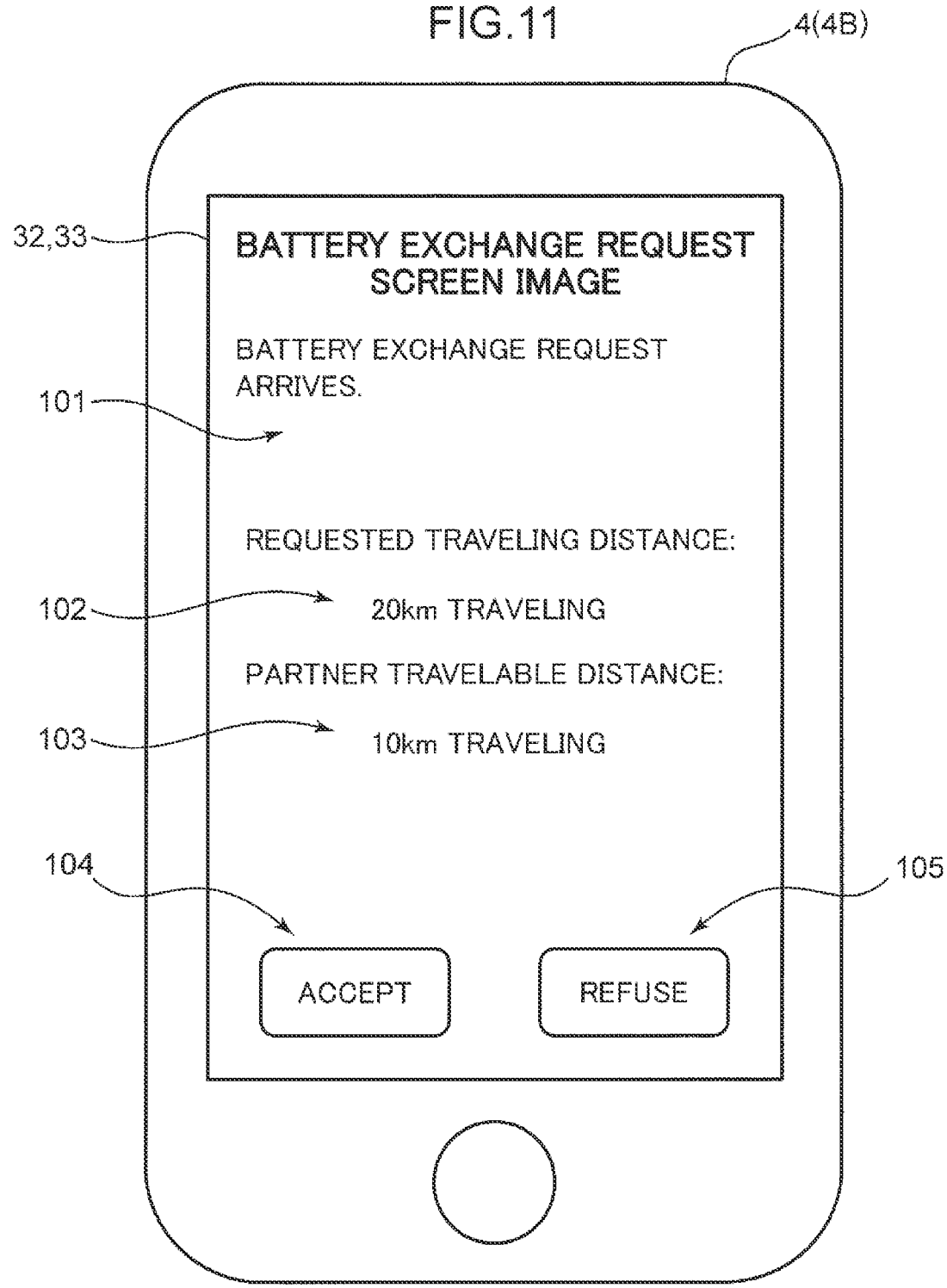
FIG. 11 shows an example of a display state of a battery exchange request screen image onto the display part.

FIG. 11 shows an example of a display state of the battery exchange request screen image 101 onto the display part 33. The exchange request screen image creation part 46 creates, based on an image creation instruction input front the management part 52, the battery exchange request screen image 101 shown in FIG. 11. The exchange request screen image creation pail 46 displays the created battery exchange request screen image 101 on the display part 33.

The battery exchange request screen image 101 includes a requested traveling distance 102 (20 km in the example)

and a partner travelable distance 103 (10 km in the example) included in the exchange request information received from the management device 2, an execution button 104 to be tapped in acceptance of the exchange request, and a cancelation button 105 to be tapped in no acceptance of the exchange request.

The user of the electric scooter 38 compares the travelable distance (30 km in the example) thereof as displayed on the display part 13 with the requested traveling distance 102 (20 km in the example) included in the battery exchange request screen image 101. The user further compares a traveling distance required for the scooter thereof to reach a destination from a current location with the partner travelable distance 103 (10 km in the example) included in the battery exchange request screen image 101. In a case where the travelable distance of the scooter of the user is equal to or longer than the requested traveling distance 102, and the required traveling distance of the scooter of the user is equal to or shorter than the partner travelable distance 103, the user can exchange the battery thereof with the battery 12 of the electric scooter 3A. Thus, the user can tap the execution button 104.

Conversely, in a case where the travelable distance of the electric scooter 3B is shorter than the requested traveling distance 102 about the electric scooter 3A, the battery remaining amount of the electric scooter 3A would remain insufficient even after the exchange of the battery 12 of the electric scooter 3A with the battery 12 of the electric scooter 3B. Hence, the user of the electric scooter 3B taps the cancelation button 105 when the travelable distance of the scooter of the user is shorter than the requested traveling distance 102. In this respect, the management device 2 may periodically receive, from each electric scooter 3, information indicating the current battery remaining amount and manages the information, and the exchange partner candidate specifying part 72 may exclude, from exchange partner candidates, an electric scooter 3 having a power amount smaller than a power amount corresponding to the requested traveling distance 102 about the electric scooter 3A in step SP202 to prevent an associated user from wrongly tapping the execution button 104.

Similarly, when the required traveling distance of the electric, scooter 3B is longer than the travelable distance (i.e., partner travelable distance 103) of the electric scooter 3A, the exchange of the battery 12 of the electric scooter 3B with the battery 12 of the electric scooter 3A would result in an insufficient battery remaining amount for the electric scooter 3B. Hence, the user of the electric scooter 3B taps the cancelation button 105 when the required traveling distance of the scooter thereof is longer than the partner travelable distance 103. In this respect, the management device 2 may periodically receive, from each electric scooter 3, information about a destination, and the exchange partner candidate specifying part 72 may exclude, from the exchange partner candidates, an electric scooter 3 having a required traveling distance longer than the travelable distance of the electric scooter 3A in step SP 202 to prevent an associated user from wrongly tapping the execution button 104.

The partner travelable distance 103 is displayed as text information in FIG. 11, but may be displayed as map information indicating a travelable area of the scooter having provided the battery exchange.

FIG. 27 shows an example of a display state of a travelable area display screen image 151 onto the display part 33. The travelable area display screen image 151 includes map information 152, and a confirmation button 153 to be tapped in confirmation. The map information 152 shows a mark indicating a current location of the associated scooter at almost the center of the screen image. The map information 152 shows roads around the current location of the scooter in a plurality of colors for classification. The map information 152 may show a mark indicating a destination of the scooter.

For instance, a road within the partner travelable distance 103 from the current location of the scooter is displayed in blue (corresponding to the bold solid line in FIG. 27). The displaying in blue means an area accessible without using the battery 12 to the limit of the remaining amount thereof.

A road outside (far away from) the blue display area at a predetermined distance therefrom is displayed in yellow (corresponding to the thin solid line in FIG. 27), The displaying in yellow means an area accessible by using the battery 12 to the limit of the remaining amount thereof.

A road outside (far away from) the yellow display area is displayed in red (corresponding to the dashed line in FIG. 27). The displaying in red means an area inaccessible even by using the battery 12 to the limit of the remaining amount thereof.

In this manner, the user of the electric scooter 3B having received the exchange request information can easily determine, based on the map information 152, whether the scooter thereof would reach the destination even with the battery 12 to be obtained after the exchange.

Subsequently, in step SP303, the exchange acceptance information acquisition part 43 determines, based on tapping or no tapping of the execution button 104 on the battery exchange request screen image 101 by the user of the electric scooter 3B, whether an exchange request acceptance is input.

When the execution button 104 is tapped by the user (YES in step SP303), the exchange acceptance information acquisition part 43 determines that the exchange request acceptance is input, and the communication part 51 transmits tin exchange acceptance signal to the management device 2 in the subsequent step SP304. The exchange acceptance signal includes identification information (vehicle ID) of the electric scooter 3B. Conversely, when the cancelation button 105 is tapped by the user (No in step SP303), the process is finished without transmitting the exchange acceptance signal.

Figure 12:
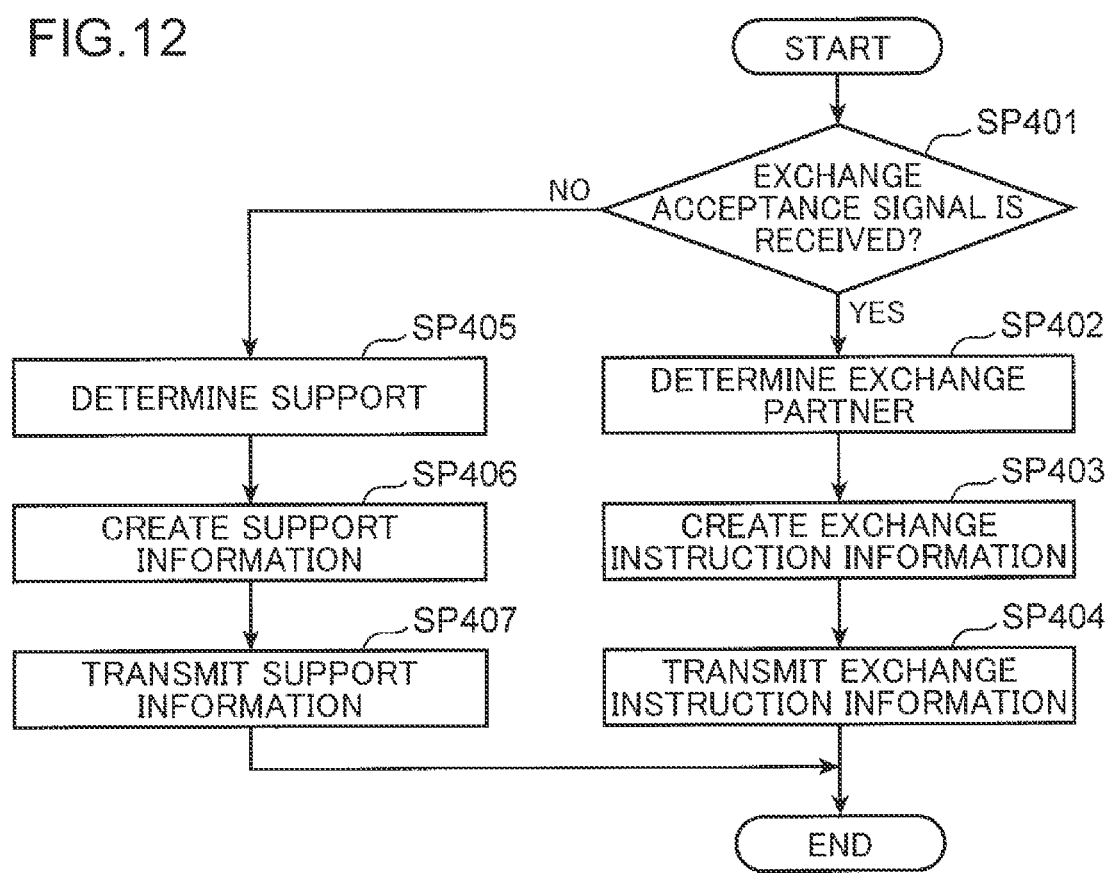
FIG. 12 is a flowchart showing contents of steps until transmission of exchange instruction information, in the process sequence shown in FIG. 1, as executed in the management device.

FIG. 12 is a flowchart showing contents of steps until transmission of exchange instruction information, in the process sequence shown in FIG. 1, as executed in the management device 2.

First, the management part 71 determines, in step SP401, whether the communication part 61 receives an exchange acceptance signal from at least one exchange partner candidate.

When the communication part 61 receives the exchange acceptance signal (YES in step SP401), the exchange partner determination part 74 determines, as an exchange partner, specific one electric scooter 3 providing an exchange of the battery 12 of the electric scooter 3A therewith in the subsequent step SP402. In a case where only the one electric scooter 3 sends the exchange acceptance signal, the exchange partner determination part 74 determines the one electric scooter 3 as the exchange partner. In another case where a plurality of electric scooters 3 sends exchange acceptance signals, the exchange partner determination part 74 determines a specific electric scooter 3 whose exchange acceptance signal is firstly received by the communication part 61 as the exchange partner. Alternatively, the exchange partner determination part 74 may determine an electric scooter 3 whose distance to the electric scooter 3A is shortest as the exchange partner. In the following description, the electric scooter 3B is determined as the exchange partner.

Next, in step SP403, the exchange instruction information creation part 75 specifies, based on location information of each of the electric scooters 3A, 3B, a meeting place where the electric scooters 3A, 3B meet each other. The exchange instruction information creation part 75 specifies a specific place, as the meeting place, on a public road closest to a middle position between the current locations of the electric scooters 3A, 3B. Alternatively, when the management device 2 manages information about a destination of each of the electric scooters 3, the exchange instruction information creation part 75 may specify, as the meeting place, a middle position between locations where the electric scooters 3A, 3B are closest to each other (preferably, an intersection between estimated traveling routes of the two scooters) in a lapse of a predetermined time (e.g., thirty minutes) from a current time. The exchange instruction information creation part 75 creates exchange instruction information including a meeting time, the meeting place, and partner identification information (e.g., the number of a license plate or number plate). For a required movement distance from one of the current locations of the electric scooters 3A, 3B, which is longer than a required movement distance from the other of the current locations, to the meeting place, the exchange instruction information creation part 75 can calculate, based on the longer required movement distance and an average speed, a required movement time, and set a time in a lapse of the required movement time from the current time as the meeting time.

Subsequently, the communication part 61 transmits, in step SP404, the exchange instruction information created in step SP403 to the portable terminal devices 4A, 4B respectively carried by the users of the electric scooters 3A, 3B. Besides, the communication part 61 transmits other partner determination information indicating that other candidate is determined as the exchange partner to an electric scooter 3 which is not determined as the exchange partner among the electric scooters 3 each having sent the exchange acceptance signal.

In contrast, when the communication part 61 receives no exchange acceptance signal from any of exchange partner candidates (NO in step SP401), the management part 71 determines, in the subsequent step SP405, to cause the manager of the sharing service to perform a support. In this support, a support staff member hurries from a closest service base by a support vehicle (or a support scooter) with a battery 12 in a fully charged state, and the support staff member exchanges the battery 12 in the fully charged state with the battery 12 of the electric scooter 3A.

Then, in step SP406, the management part 71 specifies the service base closest to the current location of the electric scooter 3A, and creates support information including: the meeting time and the meeting place when and where the electric scooter 3A and the support vehicle meet each other; and identification information (e.g., a license plate number) of the support vehicle.

Subsequently, the communication part 61 transmits, in step SP407, the support information created in step SP406 to the portable terminal device 4A carried by the user of the electric scooter 3A. Moreover, the communication part 61 instructs the closest service base to support the electric scooter 3A by transmitting the support information to the service base.

Figure 13:
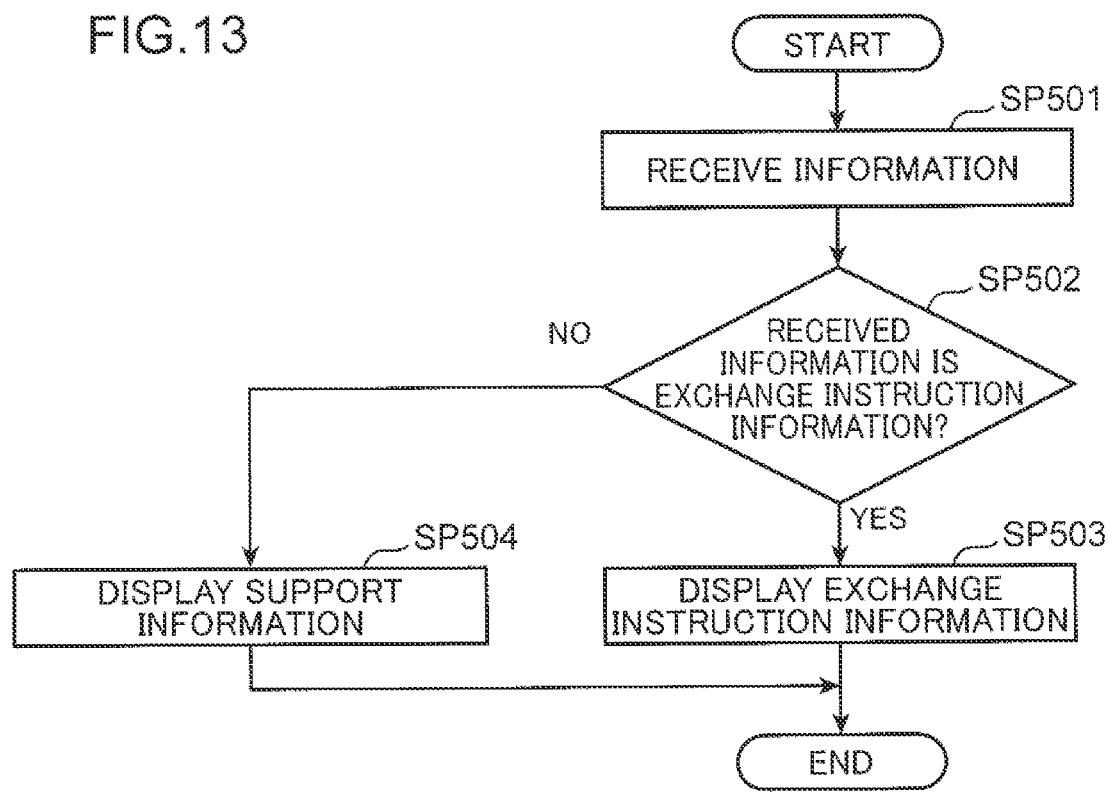
FIG. 13 is a flowchart showing contents of steps until receipt of exchange instruction information, in the process sequence shown in FIG. 1, for the electric scooter.

FIG. 13 is a flowchart showing contents of steps until receipt of the exchange instruction information, in the process sequence shown in FIG. 1, for the electric scooter 3A.

First, the communication part 51 receives, in step SP501, information from the management device 2.

Next, the management part 52 determines, in step SP502, whether the information received in step SP501 is exchange instruction information.

When the information received hi step SP501 is determined as the exchange instruction information (YES in step SP502), the exchange instruction screen image creation part 47 creates, based on an image creation instruction input from the management part 52, a battery exchange determination screen image 111 in the subsequent step SP503. The exchange instruction screen image creation part 47 displays the created battery exchange determination screen image 111 on the display part 33.

FIG. 14 shows an example of a display state of the battery exchange determination screen image 111 onto the display part 33. The battery exchange determination screen image 111 includes a meeting time 112, a map 113 showing a meeting place, identification information 114 including a partner license plate number and other information, and a confirmation button 115.

Conversely, when the information received in step SP501 is not determined as the exchange instruction information but determined as the support information (NO in step SP502), the exchange instruction screen image creation part 47 creates, based on an image creation instruction input from the management part 52, a support determination screen image 120 in the subsequent step SP504. The exchange instruction screen image creation part 47 displays the created support determination screen image 120 on the display part 33.

Figure 15:
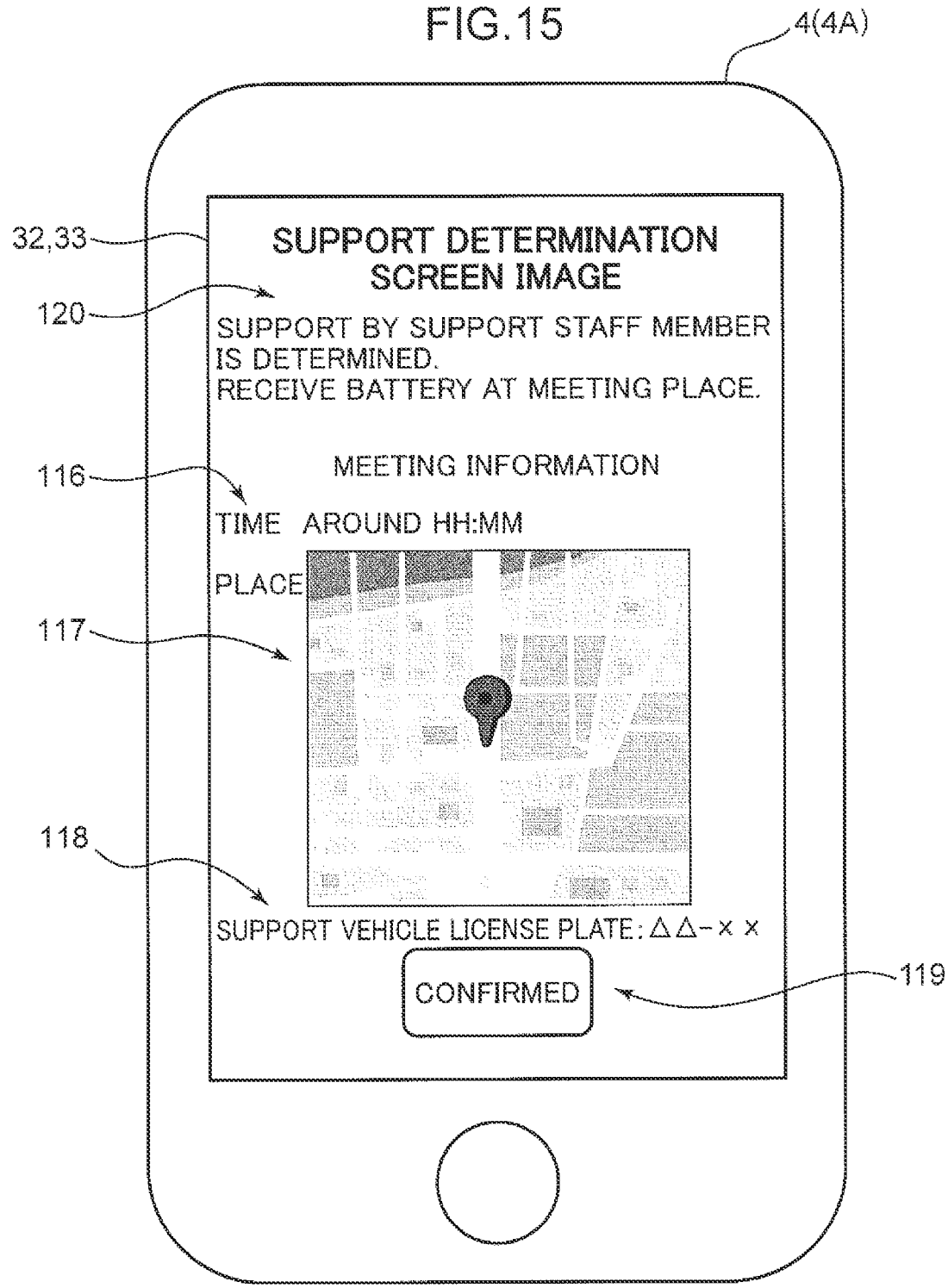
FIG. 15 shows an example of a display state of a support determination screen image onto the display part.

FIG. 15 shows an example of a display state of the support determination screen image 120 onto the display part 33. The support determination screen image 120 includes a meeting time 116, a map 117 showing a meeting place, identification information 118 including a license plate number of a support vehicle and other information, and a confirmation button 119.

Figure 16:
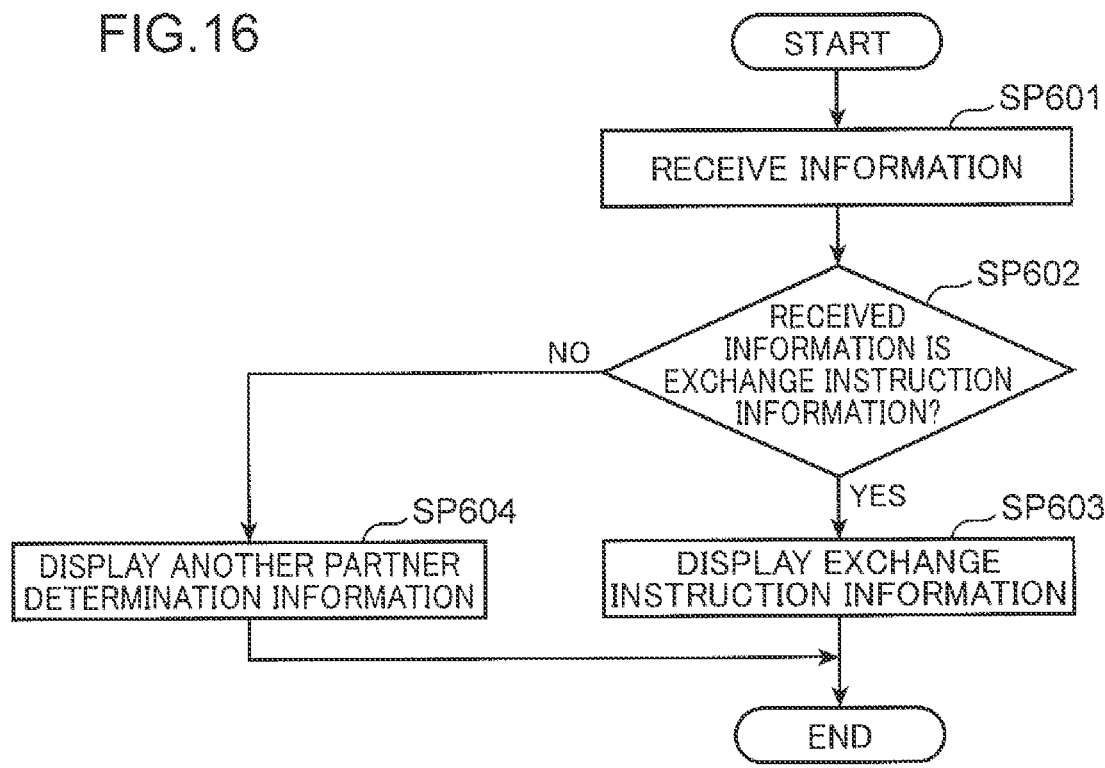
FIG. 16 is a flowchart showing contents of steps until receipt of the exchange instruction information, in the process sequence shown in FIG. 1, for the electric scooter.

FIG. 16 is a flowchart showing contents of steps until receipt of the exchange instruction information, in the process sequence shown in FIG. 1, for the electric scooter 3B.

First, the communication part 51 receives, in step SP601, information from the management device 2.

Next, the management part 52 determines, in step SP602, whether the information received in step SP601 is exchange instruction information.

When the information received in step SP601 is determined as the exchange instruction information (YES in step SP602), the exchange instruction screen image creation part 47 creates, based on an image creation instruction input from the management part 52, a battery exchange determination screen image 121 in the subsequent step SP603. The exchange instruction screen image creation part 47 displays the created battery exchange determination screen image 121 on the display part 33.

FIG. 17 shows an example of a display state of the battery exchange determination screen image 121 onto the display part 33. The battery exchange determination screen image 121 includes a meeting time 122, a map 123 showing a meeting place, identification information 124 including a partner license plate number and other information, and a confirmation button 125.

Conversely, when the information received in step SP601 is not determined as the exchange instruction information but determined as other partner determination information (NO in step SP602), the exchange instruction screen image creation part 47 creates, based on an image creation instruction input from the management part 52, an other partner determination screen image in the subsequent step SP604. The exchange instruction screen image creation part 47 displays the created other partner determination screen image on the display part 33. Although illustrated, the other partner determination screen image includes a text message indicating that other candidate is determined as the exchange partner for the battery 12.

The respective users of the electric scooters 3A, 3B move to the meeting place designated by the battery exchange determination screen images 111, 121 by the electric scooters 3A, 3B, respectively. The users meet each other at the meeting place to exchange the battery 12 of the electric scooter 3A with the battery 12 of the electric scooter 3B.

Figure 18:
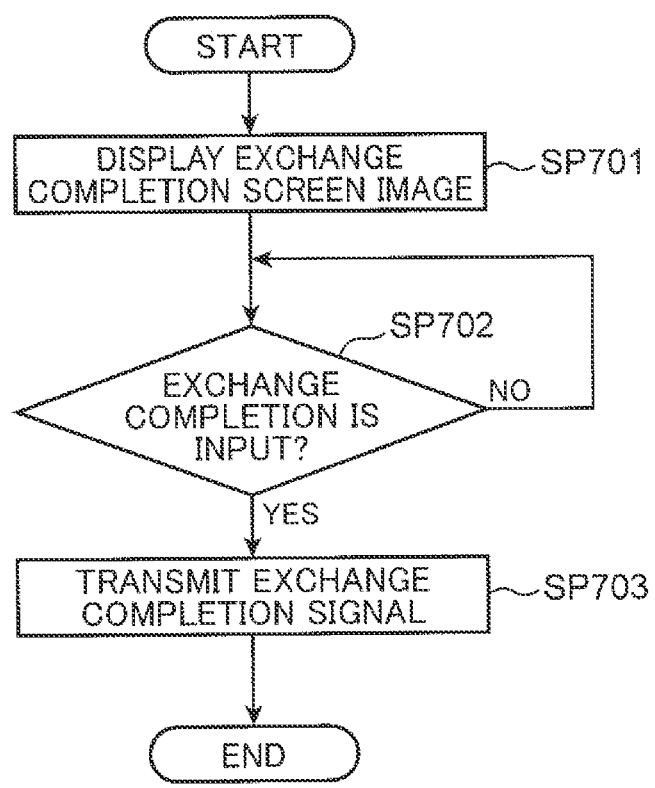
FIG. 18 is a flowchart showing contents of steps until transmission of an exchange completion signal, in the process sequence shown in FIG. 1, for the electric scooter.

FIG. 18 is a flowchart showing contents of steps until transmission of an exchange completion signal, in the process sequence shown in FIG. 1, for each of the electric scooters 3A, 3B.

First, in step SP701, the exchange completion screen image creation part 48 creates, based on an image creation instruction input from the management part 52, the battery exchange completion input screen image 131. The exchange completion screen image creation part 48 displays the created battery exchange completion input screen image 131 on the display part 33.

FIG. 19 shows an example of a display state of the battery exchange completion input screen image 131 onto the display part 33. The battery exchange completion input screen image 131 includes a completion button 132 to be tapped after a completion of the exchange work for the battery 12.

Subsequently, in step SP702, the exchange completion signal acquisition part 44 determines, based on the tapping or no tapping of the completion button 132 by the user, whether an exchange completion is input, in a state where the battery exchange completion input screen image 131 is displayed on the display part 33.

When the exchange completion is not input (NO in step SP702), step SP702 is repetitively executed on a standby for an input of the exchange completion.

When the exchange completion is input (YES in step SP702), the exchange completion signal acquisition part 44 creates an exchange completion signal indicating an appropriate performance of the exchange of the battery 12, and the communication part 51 transmits the created exchange completion signal to the management device 2 in the subsequent step SP703.

Figure 20:
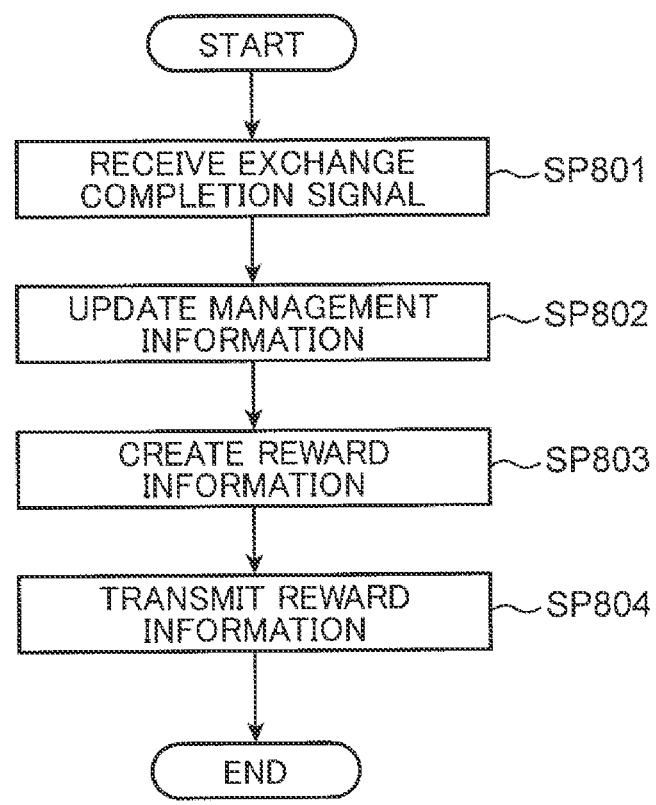
FIG. 20 is a flowchart showing contents of steps until transmission of reward information, in the process sequence shown in FIG. 1, as executed in the management device.

FIG. 20 is a flowchart showing contents of steps until transmission of reward information, in the process sequence shown in FIG. 1, as executed in the management device 2.

First, the communication part 61 receives, in step SP801, the exchange completion signal from each of the electric scooters 3A, 3B.

Subsequently, the management information update part 76 updates, in step SP802, contents of the management information 78 stored in the storage part 63 in accordance with a way of the battery exchange performed between the electric scooters 3A, 3B.

Figure 21:
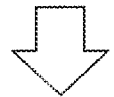
FIG. 21 shows an exemplary update of management information in a first way of a battery exchange.

FIG. 21 shows an exemplary update of the management information 78 in a first way of the battery exchange. (A) of FIG. 21 shows management information 78 to be updated, and (B) of FIG. 21 shows updated management information 78. In the first way, a battery 12 of an electric scooter 3 includes at least one battery cell unit, and a battery exchange is performed per battery including the battery cell unit. For instance, in a case where the battery 12 includes two battery cell units, the two battery cell units are exchanged in the battery exchange. The first way is preferably applicable to a battery including a single battery cell unit, or a battery including a plurality of battery cell units used simultaneously in parallel connection.

In the first way, the at least one battery cell unit forming the single battery is given a common battery ID. The management information 78 sets a correspondence relation among identification information (scooter ID) of each electric scooter 3, identification information (battery ID) of a corresponding battery 12 mounted to the electric scooter 3, identification information (user ID) of a user renting the electric scooter 3, and a current location of the electric scooter 3. The management information update part 76 updates, when an exchange of the batteries 12 is performed between the electric scooter 3A and the electric scooter 31B, a set content of the management information 78 by interchanging the correspondence relation between the scooter ID and the battery ID, among the management information 78, for the electric scooters 3A, 3B. Owing to the update of the management information 78 by the management information update pail 76, the management device 2 can hold correct management information 78 even after the exchange of the batteries 12 between the electric scooter 3A and the electric scooter 3B.

The first way eliminates the need for managing the battery remaining amount per battery cell unit in each electric scooter 3 and the management device 2, and thus can simplify the process more effectively than an exchange per battery cell unit.

Figure 22:
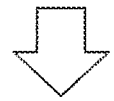
FIG. 22 shows an exemplary update of management information in a second way of the battery exchange.

FIG. 22 shows an exemplary update of the management information 78 in a second way of the battery exchange. (A) of FIG. 22 shows management information 78 to be updated, and (B) of FIG. 22 shows updated management information 78. In the second way, a battery 12 of an electric scooter 3 includes a plurality of battery cell units which are independently exchangeable, and the battery exchange is performed per battery cell unit. For instance, in a case where the battery 12 includes two battery cell units, one of the battery cell units or both the battery cell units are exchanged in the battery exchange. The second way is preferably applicable to a battery including a plurality of cell units to be sequentially used through a connection shift.

In the second way, each of the battery cell units forming the single battery is individually given a battery cell unit ID. The management information 78 sets a correspondence relation among identification information (scooter ID) of each electric scooter 3, identification information (battery cell unit ID) of a corresponding battery cell unit mounted to the electric scooter 3, identification information (user ID) of a user renting the electric scooter 3, and a current location of the electric scooter 3. The management information update part 76 updates, when an exchange of the batteries 12 is performed between the electric scooter 3A and the electric scooter 3B, a set content of the management information 78 by interchanging the correspondence relation between the scooter ID and the battery cell unit ID, among the management information 78, for the electric scooters 3A, 3B. FIG. 22 shows an example where a battery cell unit mounted to the electric scooter 3A and having a battery cell unit ID "b1$b$" is exchanged with a battery cell unit mounted to the electric scooter 3B and having a battery cell unit ID "b2$b$". The remaining amount acquisition part 22 acquires a battery remaining amount per battery cell unit. The management device 2 designates a specific battery cell unit to be exchanged by including a battery cell unit ID in the exchange instruction information to be sent to the electric scooters 3A, 3B.

The second way based on the exchange per battery cell unit succeeds in adjusting an amount of increase or decrease in the battery remaining amount accompanied by the exchange more finely than the exchange per battery.

Figure 23:
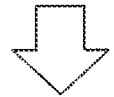
FIG. 23 shows an exemplary update of management information in a third way of the battery exchange.

FIG. 23 shows an exemplary update of the management information 78 in a third way of the battery exchange (A) of FIG. 23 shows management information 78 to be updated, and (B) of FIG. 23 shows updated management information 78. In the third way, the battery exchange is performed per vehicle.

In the third way, the management information 78 sets a correspondence relation among identification information (scooter ID) of each electric scooter 3, identification information (battery ID) of a corresponding battery 12 mounted to the electric scooter 3, identification information (user ID) of a user renting the electric scooter 3, and a current location of the electric scooter 3. The management information update part 76 updates, when an exchange of the batteries 12 is performed between the user of the electric scooter 3A and the user of the electric scooter 3B (in other words, a scooter exchange is performed), a set content of the management information 78 by interchanging the correspondence relation between the scooter ID and the user ID, among the management information 78, for the electric scooters 3A, 3B. Moreover, when the management information 78 includes information about a departure place and a destination of each user to be managed, the management information update part 76 transfers the information about the departure place and the destination as well as the user ID in the updating of the management information 78.

The third way based on the exchange of the battery 12 per scooter eliminates the need for the battery exchange or the battery cell unit exchange, and accordingly can shorten the time required for the exchange work.

Referring to FIG. 20, the reward information creation part 77 creates reward information for giving a predetermined reward to the user of the electric scooter 3B in the subsequent step SP803. The predetermined reward includes, for example, a discount point with which a fee discount is available in a subsequent use and thereafter. The reward information includes information indicating the point number about the given discount point.

The reward information creation part 77 may determine an amount of the reward (the point number) in accordance with a battery remaining amount of the provided battery 12 from the electric scooter 3B, or may define a fixed amount of the reward regardless of the battery remaining amount. When the amount of the reward is determined in accordance with the battery remaining amount, the amount of the reward may be, for example, proportional to the battery remaining amount.

This can increase an incentive to accept a battery exchange request by differentiating the amount of the reward in accordance with the battery remaining amount of the provided battery 12.

Subsequently, the communication part 61 transmits, in step SP804, the reward information created in step SP803 to a portable terminal device 4B carried by the electric scooter 3B.

Figure 24:
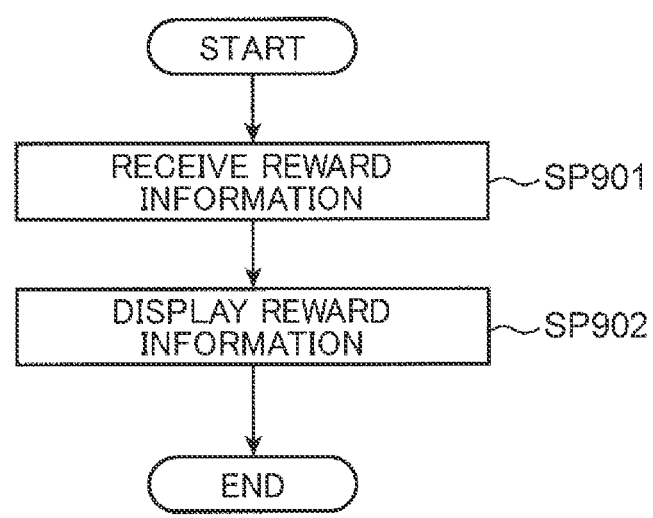
FIG. 24 is a flowchart showing contents of steps until receipt of the reward information, in the process sequence shown in FIG. 1, for the electric scooter.

FIG. 24 is a flowchart showing contents of steps until receipt of the reward information, in the process sequence shown in FIG. 1, for the electric scooter 3B.

First, in step SP901, the communication part 51 of the portable terminal device 4B carried by the user of the electric scooter 3B receives the reward information from the management device 2. The communication part 51 inputs the received reward information to the reward screen image creation part 49.

Next, in step SP902, the reward screen image creation part 49 creates, based on the input reward information, a reward display screen image 141, The reward screen image creation part 49 displays the created reward display screen image 141 on the display part 33.

Figure 25:
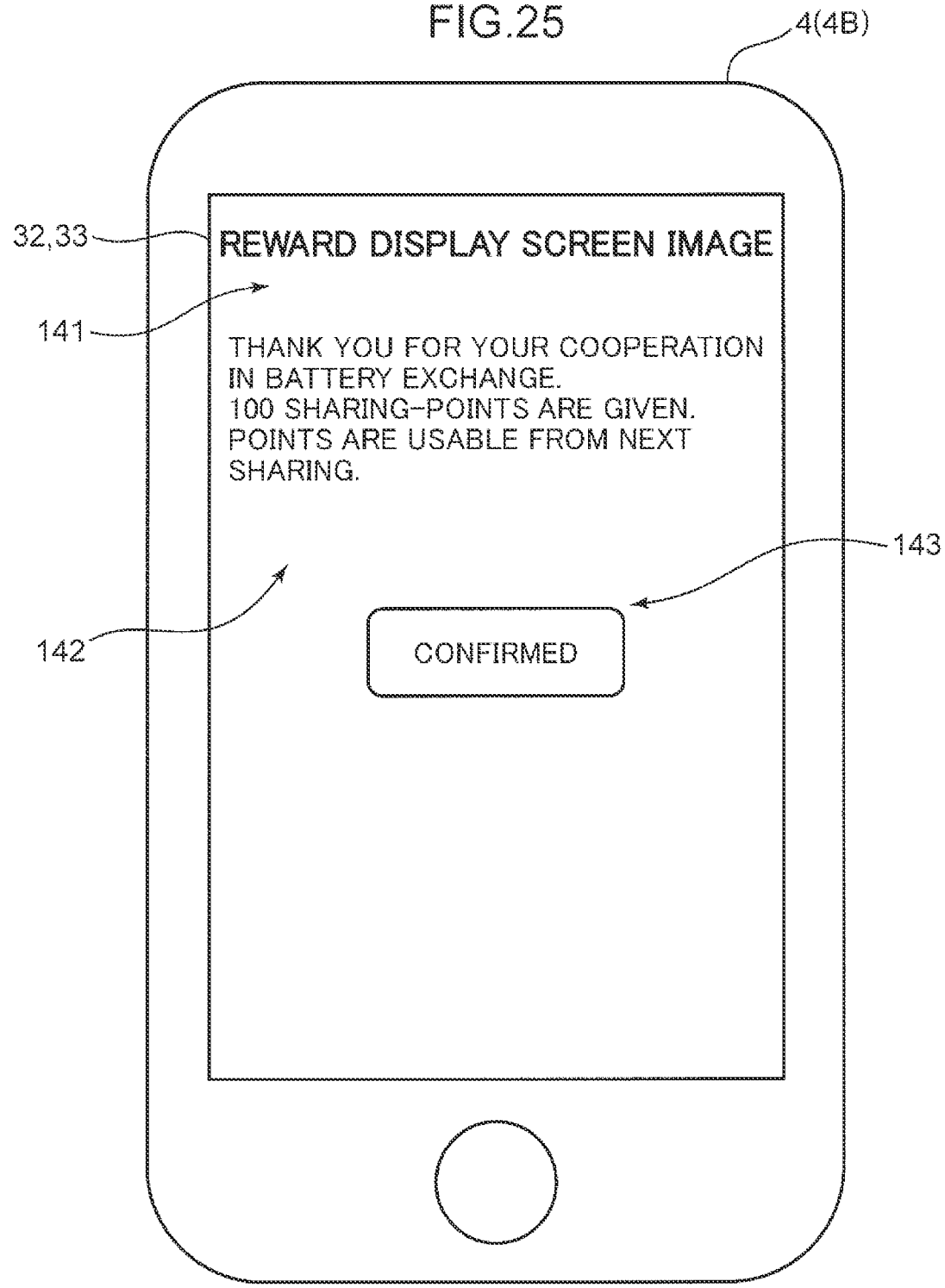
FIG. 25 shows an example of a display state of a reward display screen image onto the display part.

FIG. 25 shows an example of a display state of the reward display screen image 141 onto the display part 33. The reward display screen image 141 includes a text message 142 showing the point number about the given discount point, and a confirmation button 143.

The sharing system 1 for an electrically driven vehicle according to the embodiment can effectively prevent the electric scooter 3A from suffering the electricity shortage by an exchange of the batteries 12 between the electric scooter 3A (first vehicle) having sent exchange demand information and the electric scooter 3B (second vehicle) having sent an exchange acceptance signal. The exchange results in permitting the electric scooter 3A to travel at a distance exceeding the maximum traveling distance restricted on the battery capacity thereof. Furthermore, the exchange of the batteries 12 between the electric scooter 3A and the electric scooter 3B enables the respective users thereof to complete the relevant work more easily at a shorter time than a supply of an electric power from the electric scooter 3B to the electric scooter 3A connected to each other with a charging cable. Moreover, the cooperation between the users prevents each electric scooter 3 from suffering the electricity shortage, and hence, the manager of the sharing service for the electric scooters 3 can reduce the number of places for arranging support vehicles and the number of support vehicles. Consequently, the running cost of the service is reduceable.

The sharing system 1 for an electrically driven vehicle according to the embodiment gives a reward for the user of the electric scooter 3B, and thus can offer an incentive to each user to accept a battery exchange request when receiving relevant battery exchange request information about the battery 12.

Moreover, when the management device 2 receives no exchange acceptance signal from any of exchange partner candidates, the sharing system 1 for an electrically driven vehicle according to the embodiment can prevent the electric scooter 3A from suffering the electricity shortage by causing the manager to perform a support.

In the sharing system 1 for an electrically driven vehicle according to the embodiment, the exchange demand information includes information (demanded traveling distance in the example) indicating a battery remaining amount demanded by the electric scooter 3A. The management device 2 transmits exchange request information including the remaining amount relevant information to an exchange partner candidate. Accordingly, a user of an electric scooter 3 having received exchange request information can determine whether a battery remaining amount of the scooter of the user is equal to or larger than the battery remaining amount demanded by electric scooter 3A. When the management device 2 manages the battery remaining amount of each electric scooter 3, the management device 2 can exclude, from exchange partner candidates, an electric scooter 3 having a current battery remaining amount which is smaller than the battery remaining amount demanded by the electric scooter 3A.

In the sharing system 1 for an electrically driven vehicle according to the embodiment, the management device 2 excludes, from the exchange partner candidates, an electric scooter 3 having a current battery remaining amount which is smaller than the battery remaining amount demanded by the electric scooter 3A. This configuration can avoid, in advance, wastefully transmitting the exchange request information to such an electric scooter 3 that cannot accept the exchange request for the battery 12.

In the sharing system 1 for an electrically driven vehicle according to the embodiment, the exchange request information includes information (partner travelable distance in the example) indicating a battery remaining amount demanded by the electric scooter 3A. The management device 2 transmits exchange request information including the remaining amount relevant information to an exchange partner candidate. Accordingly, the user of the electric scooter 3 having received the exchange request information can determine whether the electric scooter of the user can reach the destination with the battery 12 of the electric scooter 3A obtained after the exchange of the battery 12 therewith.

INDUSTRIAL APPLICABILITY

A technology of managing a shamble electrically driven vehicle according to this disclosure is particularly applicable to electric scooter sharing services.

The invention claimed is:

1. A management method for managing a plurality of sharable electrically driven vehicles each configured to travel by an electric power supplied from a battery, by a management device, the management method comprising:
receiving battery exchange demand information from a first vehicle included in the plurality of sharable electrically driven vehicles, the battery exchange demand information including a demanded traveling distance of the first vehicle, the first vehicle automatically determining the demanded traveling distance based on first location information of the first vehicle and a destination of the first vehicle, the first location information being determined by acquiring GPS signals and representing current location coordinates of the first vehicle;
specifying at least one exchange partner candidate from among the plurality of sharable electrically driven vehicles, which includes a second vehicle providing a battery exchange with the first vehicle;
transmitting battery exchange request information to the at least one exchange partner candidate;
specifying, when receiving a battery exchange acceptance signal from the second vehicle of the at least one exchange partner candidate, a battery exchange place based on the first location information of the first vehicle and second location information of the second vehicle;
creating exchange instruction information including position information about the battery exchange place;
transmitting the exchange instruction information to the first vehicle and the second vehicle;
creating a reward for a user of the second vehicle when receiving a battery exchange completion signal from the second vehicle; and
determining an amount of the reward in accordance with a battery remaining amount of a battery provided from the second vehicle, with the amount of the reward increasing in proportion to the battery remaining amount.

2. The management method according to claim 1, wherein the management device gives a predetermined reward to a user of the second vehicle when receiving a battery exchange completion signal from the second vehicle.

3. The management method according to claim 1, wherein the management device transmits, to the first vehicle, support information including information indicating a support to be performed by a manager, when receiving no exchange acceptance signal from the at least one exchange partner candidate.

4. The management method according to claim 1, wherein the battery exchange demand information includes information indicating a battery remaining amount demanded by the first vehicle.

5. The management method according to claim 4, wherein the management device
receives information indicating a current battery remaining amount from each of the plurality of sharable electrically driven vehicles, and
excludes, from the at least one exchange partner candidate, a third vehicle having the current battery remaining amount which is smaller than the battery remaining amount demanded by the first vehicle.

6. The management method according to claim 1, wherein the battery exchange request information includes information indicating a battery remaining amount of the first vehicle.

7. The management method according to claim 6, wherein the second vehicle is allowed to display, based on the information indicating the battery remaining amount of the first vehicle, map information showing a travelable area of the second vehicle after the battery exchange.

8. The management method according to claim 1, wherein the management device
receives current location information from each of the plurality of sharable electrically driven vehicles, and
specifies, as the at least one exchange partner candidate, at least one vehicle whose distance to the first vehicle is at most a predetermined value at a time of receiving the battery exchange demand information from the first vehicle.

9. The management method according to claim 1, wherein the management device
receives current location information and destination information from each of the plurality of sharable electrically driven vehicles, and
specifies, as the at least one exchange partner candidate, at least one vehicle whose distance to the first vehicle is at most a predetermined value in an elapse of a predetermined time after a time of receiving the exchange demand information from the first vehicle.

10. The management method according to claim 1, wherein
the battery includes at least one battery cell unit, and
the battery exchange is performed per battery including the battery cell unit.

11. The management method according to claim 10, wherein
the management device
holds management information setting a correspondence relation between first identification information of each of the plurality of sharable electrically driven vehicles and second identification information of the battery mounted on each of the plurality of sharable electrically driven vehicles, and
updates, when the battery exchange is performed between the first vehicle and the second vehicle, a set content of the correspondence relation between the first identification information and the second identification information among the management information for each of the first vehicle and the second vehicle.

12. The management method according to claim 1, wherein
the battery includes a plurality of battery cell units which are independently exchangeable,
the exchange instruction information includes identification information of a battery cell unit to be exchanged, and
the battery exchange is performed per battery cell unit.

13. The management method according to claim 12, wherein
the management device
holds management information setting a correspondence relation between first identification information of each of the plurality of sharable electrically driven vehicles and second identification of each of the battery cell units mounted on each of the plurality of sharable electrically driven vehicles, and
updates, when a battery cell unit exchange is performed between the first vehicle and the second vehicle, a set content of the correspondence relation between the first identification information and the second identification information among the management information for each of the first vehicle and the second vehicle.

14. The management method according to claim 1, wherein
the battery exchange is performed per vehicle.

15. The management method according to claim 14, wherein
the management device
holds management information setting a correspondence relation between first identification information of each of the plurality of sharable electrically driven vehicles and second identification information of users who use the plurality of sharable electrically driven vehicles, and
updates, when the battery exchange is performed between the first vehicle and the second vehicle, a set content of the correspondence relation between the first identification information and the second identification information among the management information for the first vehicle and the second vehicle.

16. The management method according to claim 1, wherein
the first vehicle
manages a current battery remaining amount of the first vehicle, and a current location and the destination of the first vehicle, and
suggests a demand for the battery exchange to a user using the first vehicle when the current battery remaining amount of the first vehicle is smaller than an electric power amount required for the first vehicle to reach the destination from the current location.

17. A management device which manages a plurality of sharable electrically driven vehicles each configured to travel by an electric power supplied from a battery, the management device comprising:
a processor; and
a memory including a program that, when executed by the processor, causes the processor to perform operations, the operations including:
receiving battery exchange demand information from a first vehicle included in the plurality of sharable electrically driven vehicles, the battery exchange demand information including a demanded traveling distance of the first vehicle, the first vehicle automatically determining the demanded traveling distance based on first location information of the first vehicle and a destination of the first vehicle, the first location information being determined by acquiring GPS signals and representing current location coordinates of the first vehicle;
specifying at least one exchange partner candidate from among the plurality of sharable electrically driven vehicles, which includes a second vehicle providing a battery exchange with the first vehicle;
transmitting battery exchange request information to the at least one exchange partner candidate;
specifying, when receiving a battery exchange acceptance signal from the second vehicle of the at least one exchange partner candidate, a battery exchange place based on the first location information of the first vehicle and second location information of the second vehicle;
creating exchange instruction information including position information about the battery exchange place;
transmitting the exchange instruction information to the first vehicle and the second vehicle;
creating a reward for a user of the second vehicle when receiving a battery exchange completion signal from the second vehicle; and
determining an amount of the reward in accordance with a battery remaining amount of a battery provided from the second vehicle, with the amount of the reward increasing in proportion to the battery remaining amount.

18. A non-transitory computer-readable recording medium recording a program for causing an information processor mounted on a management device, which manages a plurality of sharable electrically driven vehicles each configured to travel by power supplied from a battery, to perform a process, the process comprising:
receiving battery exchange demand information from a first vehicle included in the plurality of sharable electrically driven vehicles, the battery exchange demand information including a demanded traveling distance of the first vehicle, the first vehicle automatically determining the demanded traveling distance based on first location information of the first vehicle and a destination of the first vehicle, the first location information being determined by acquiring GPS signals and representing current location coordinates of the first vehicle;
specifying at least one exchange partner candidate from among the plurality of sharable electrically driven vehicles, which includes a second vehicle providing a battery exchange with the first vehicle;
transmitting battery exchange request information to the at least one exchange partner candidate;
specifying, when receiving a battery exchange acceptance signal from the second vehicle of the at least one exchange partner candidate, a battery exchange place based on the first location information of the first vehicle and second location information of the second vehicle;
creating exchange instruction information including position information about the battery exchange place;

transmitting the exchange instruction information to the first vehicle and the second vehicle;

creating a reward for a user of the second vehicle when receiving a battery exchange completion signal from the second vehicle; and determining an amount of the reward in accordance with a battery remaining amount of a battery provided from the second vehicle, with the amount of the reward increasing in proportion to the battery remaining amount.

\* \* \* \* \*